(12) United States Patent
Townsley et al.

(10) Patent No.: US 8,866,762 B2
(45) Date of Patent: Oct. 21, 2014

(54) METHOD AND APPARATUS FOR ARBITRATING AMONG CONTIGUOUS BUTTONS ON A CAPACITIVE TOUCHSCREEN

(75) Inventors: David Townsley, Cupertino, CA (US); Sarangan Narasimhan, San Jose, CA (US)

(73) Assignee: Pixart Imaging Inc., Hsin-Chu (TW)

( * ) Notice: Subject to any disclaimer, the term of this patent is extended or adjusted under 35 U.S.C. 154(b) by 544 days.

(21) Appl. No.: 13/174,777

(22) Filed: Jul. 1, 2011

(65) Prior Publication Data

US 2013/0002599 A1    Jan. 3, 2013

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)
USPC .................................................... 345/173

(58) Field of Classification Search
CPC ........ G06F 3/0488; G06F 3/041; G06F 3/044
USPC .......................... 345/173–178; 715/700–864
See application file for complete search history.

(56) References Cited

U.S. PATENT DOCUMENTS

| | | | |
|---|---|---|---|
| 7,098,896 B2 | 8/2006 | Kushler et al. | |
| 7,694,231 B2 | 4/2010 | Kocienda et al. | |
| 2008/0122796 A1 | 5/2008 | Jobs et al. | |
| 2010/0177056 A1 | 7/2010 | Kocienda et al. | |
| 2010/0188357 A1 | 7/2010 | Kocienda et al. | |

OTHER PUBLICATIONS

Preliminary Product Data Sheet entitled "AMRI-5200 Low-Power 10-Touch Controller" Apr. 20, 2011, Avago Technologies.

*Primary Examiner* — Joseph Feild
*Assistant Examiner* — Gustavo Polo
(74) *Attorney, Agent, or Firm* — McClure, Qualey & Rodack, LLP

(57) ABSTRACT

Various embodiments of a capacitive touchscreen system and corresponding methods are described. A touchscreen controller is operably connected to a first plurality of drive electrodes, a second plurality of sense electrodes, and a host processor. The touchscreen controller has computer-readable button group programming instructions and data loaded into a first memory portion thereof from the host processor that comprise steps for sensing and arbitrating among touches occurring on and within a first plurality of buttons. Firmware instructions and data are loaded into a second portion of the memory of the touchscreen controller. The first plurality of buttons is arranged in a first group on the touchscreen, and the first group is located within a first portion of the touchscreen. Capacitive sensing of touches occurring on and within at least second portions of the touchscreen that are located outside the first portion of the touchscreen are controlled by the firmware instructions.

42 Claims, 15 Drawing Sheets

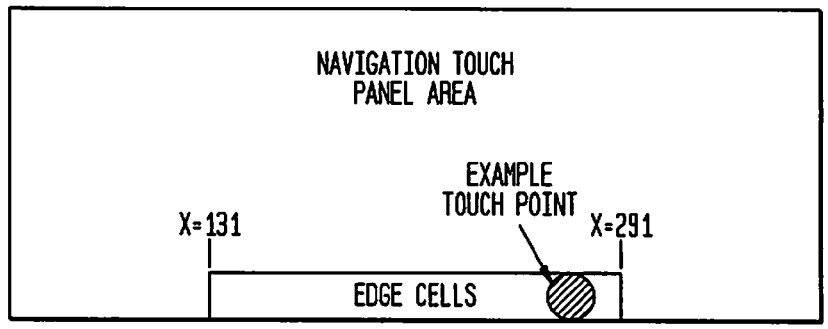
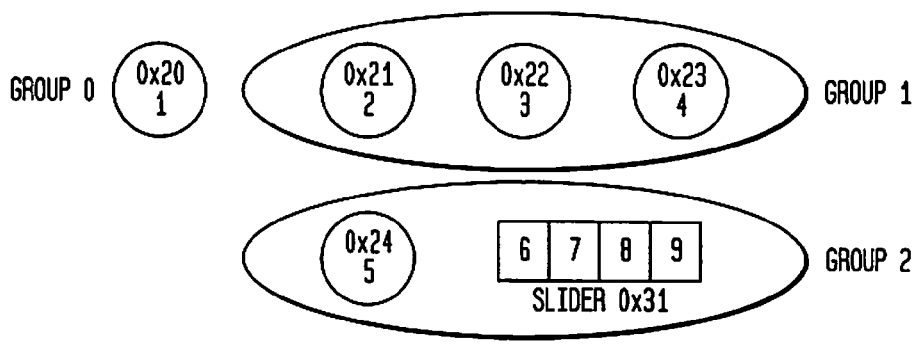
FIG. 8

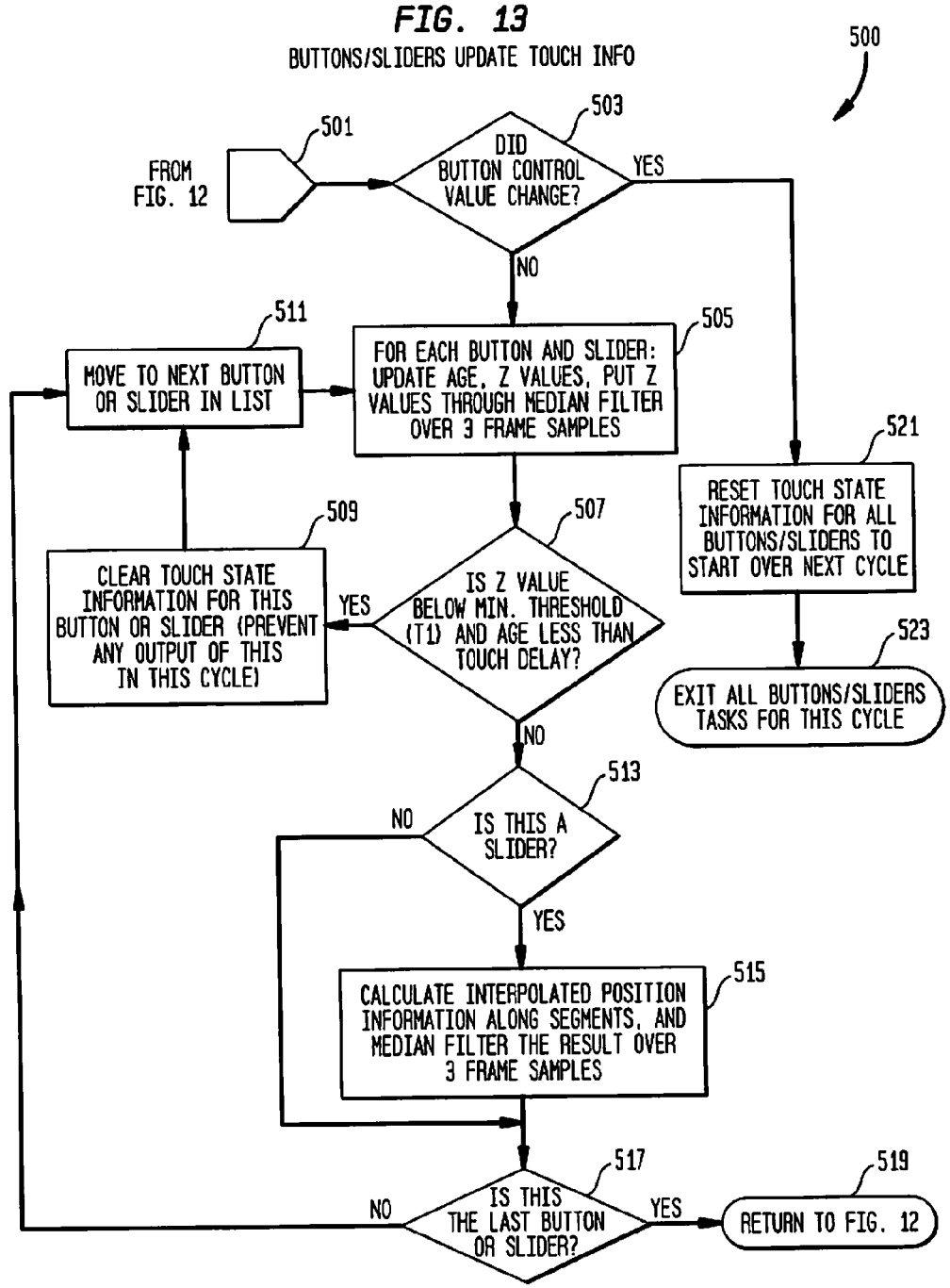

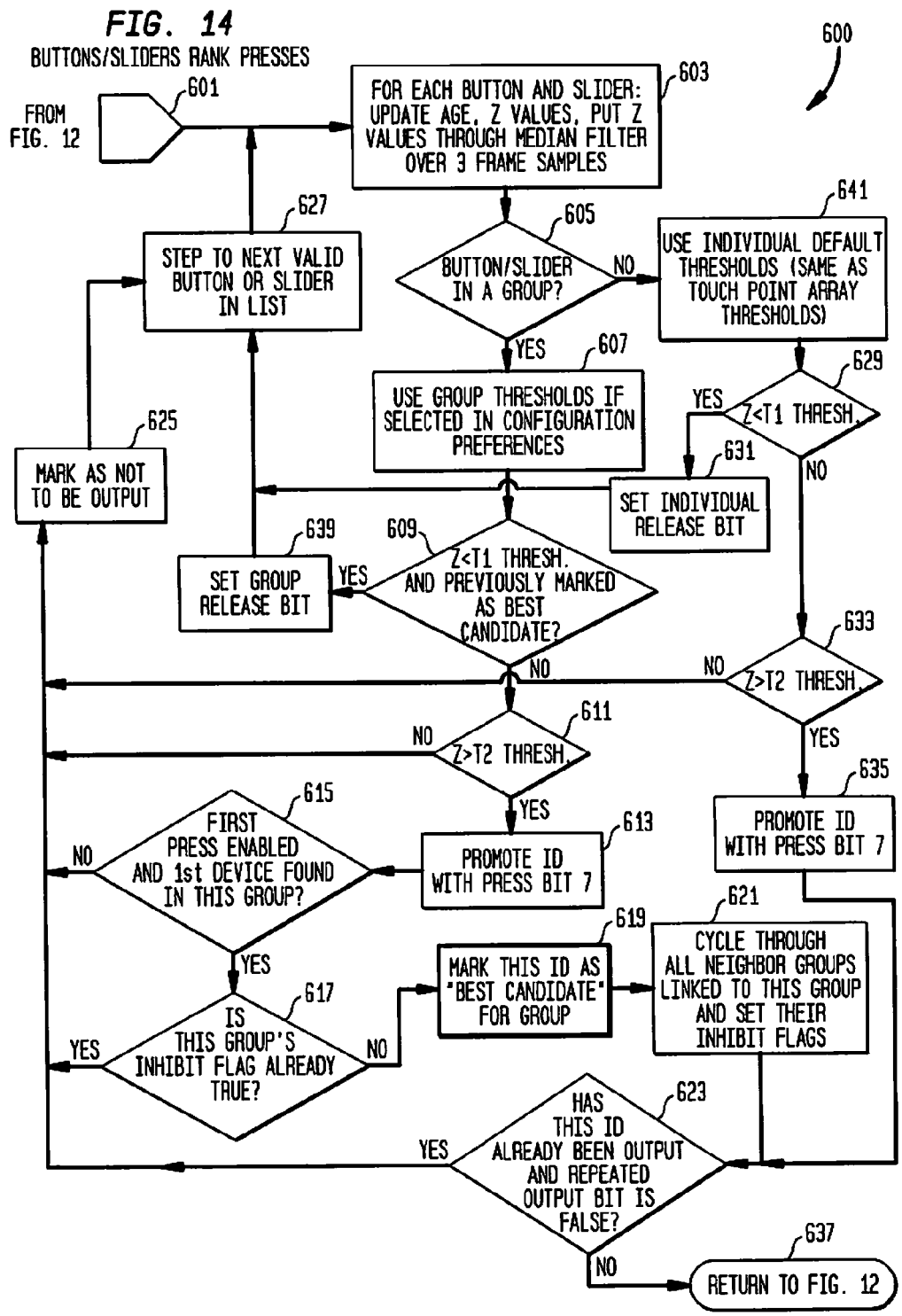

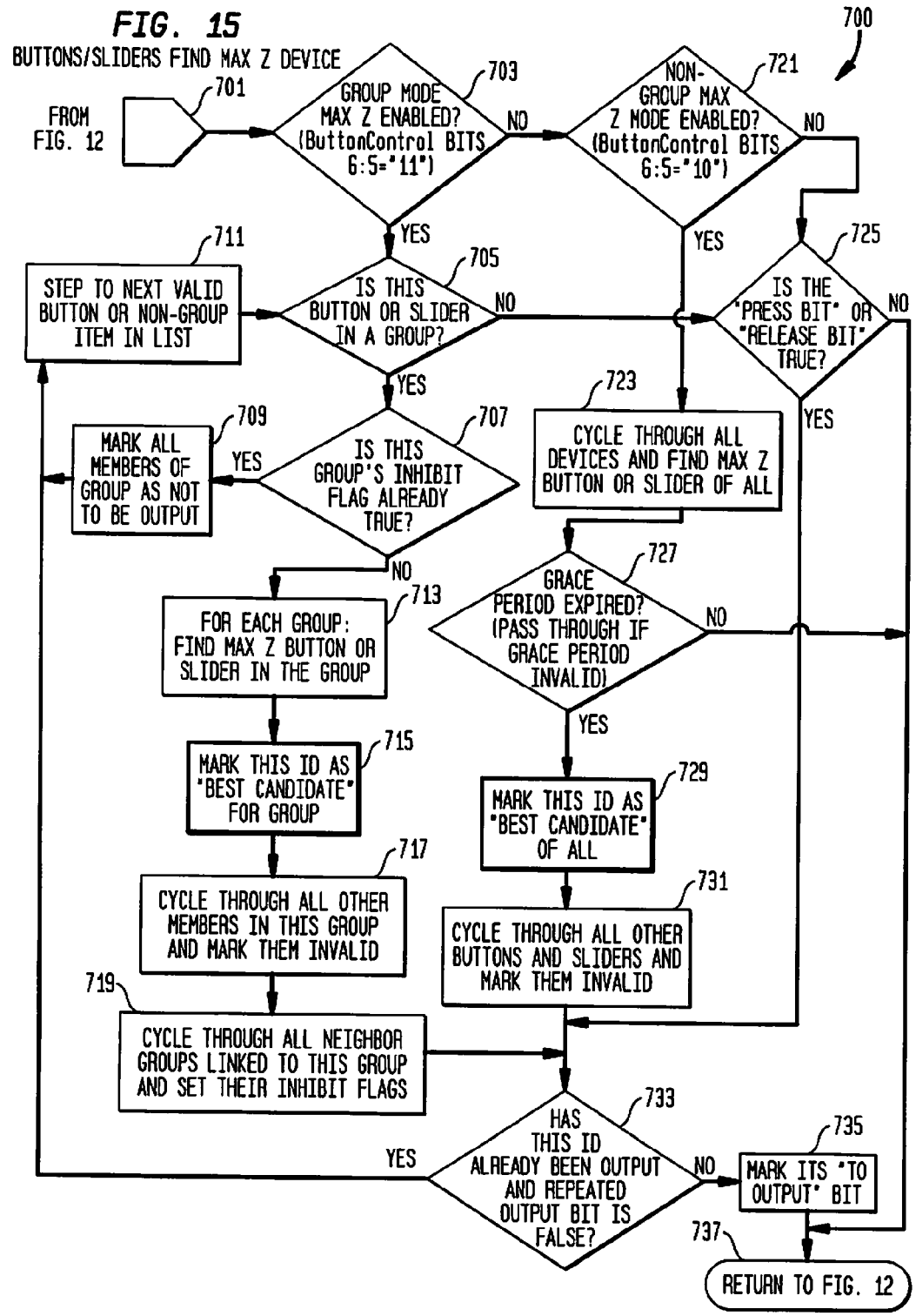

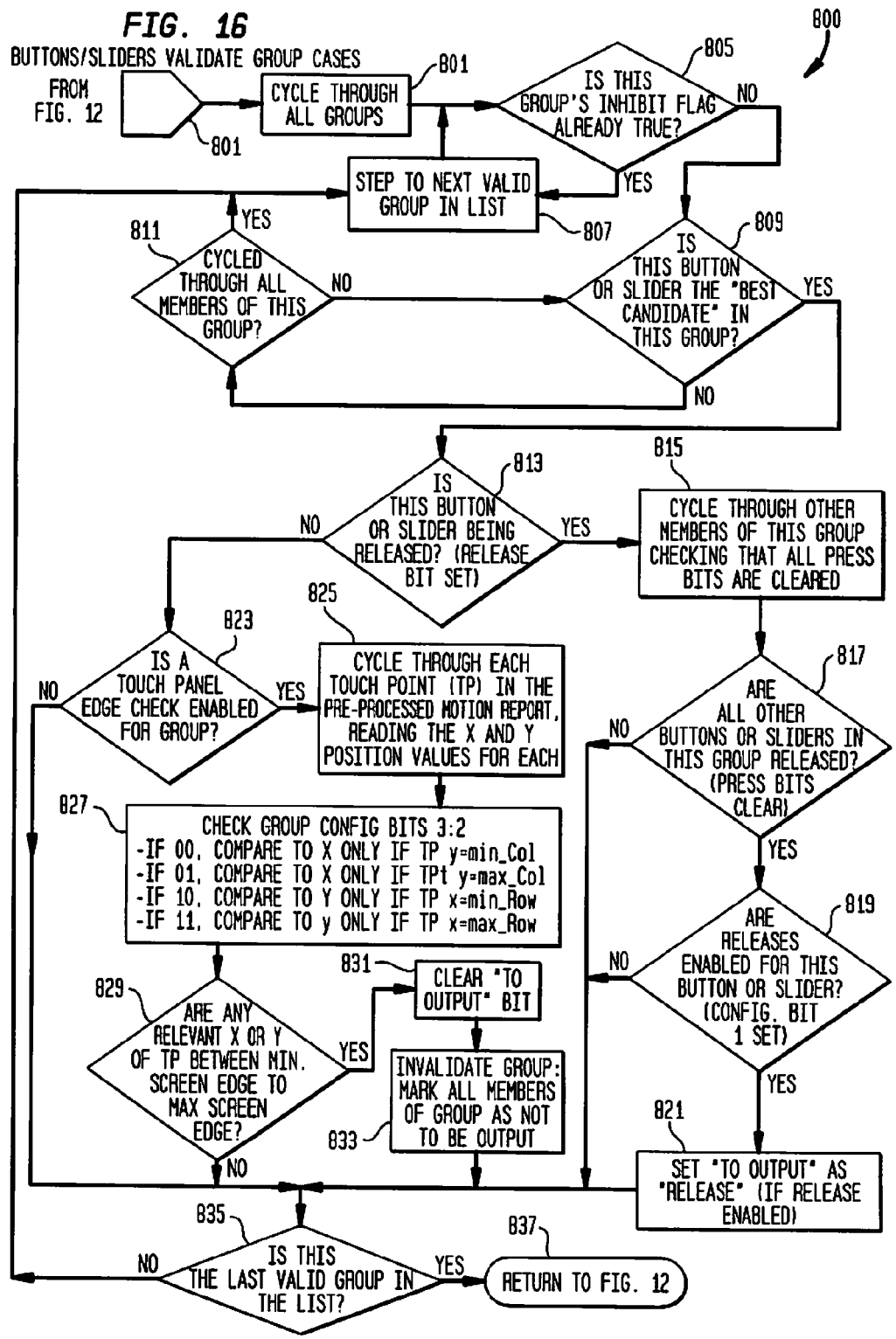

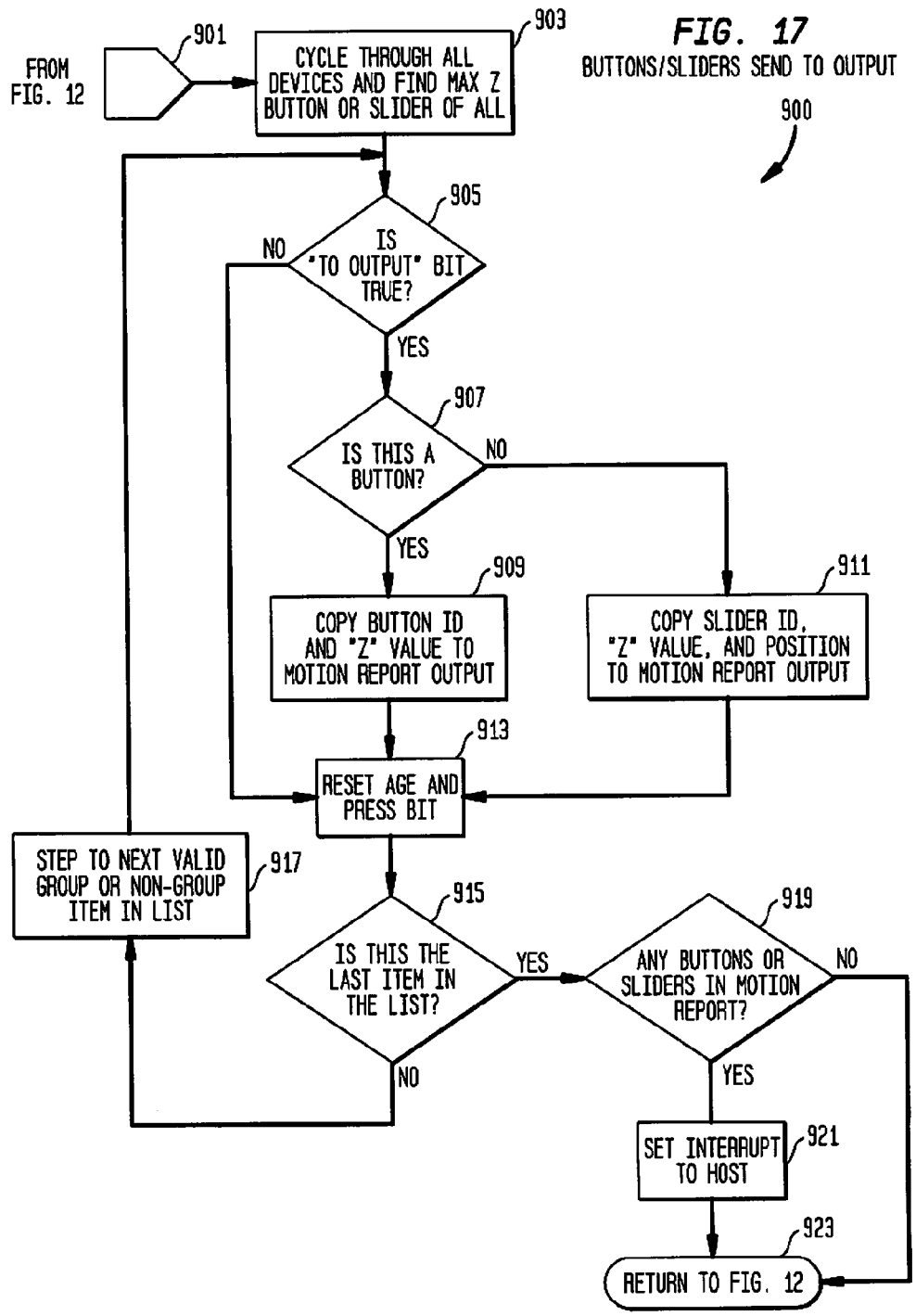

METHOD AND APPARATUS FOR ARBITRATING AMONG CONTIGUOUS BUTTONS ON A CAPACITIVE TOUCHSCREEN

FIELD

Various embodiments of the invention described herein relate to the field of touchscreen or touchpad systems, devices, components and methods configured to detect touches on a touchscreen or touch panel using capacitive sensing techniques.

BACKGROUND

In capacitive touchscreen devices, there is a risk that a user can accidentally and unintentionally trigger one or more buttons that are adjacent to a button that the user desires to be press or touch. One typical approach many capacitive touchscreen devices employ to solve this problem is to search for a button having the strongest touch signal associated therewith, and automatically raise the touch threshold, or suppress presses or touches on neighboring buttons. Such an approach requires knowing the location of every button, and which buttons are each button's neighbors, which can be an especially memory-intensive method in the case where location information must be embedded in the limited memory of the touchscreen controller associated with the device.

What is needed is a capacitive touchscreen device and system, and method of operating such a system, that is capable of discriminating and arbitrating accurately between touches made on more than one button.

SUMMARY

According to one embodiment, there is provided a method of operating a capacitive touchscreen system comprising a first plurality of electrically conductive drive electrodes arranged in rows or columns, a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a touchscreen controller operably connected to the first plurality of drive electrodes and the second plurality of sense electrodes, the touchscreen controller being operably connected to a host processor, the method comprising downloading computer-readable button group programming instructions and data from the host processor to a first portion of a memory of the touchscreen controller, the computer-readable button group programming instructions and data comprising steps for sensing and arbitrating among touches occurring on and within a first plurality of buttons, the first plurality of buttons being arranged in a first group on the touchscreen, the first group being located within a first portion of the touchscreen, capacitive sensing of touches occurring on and within at least second portions of the touchscreen that are located outside the first portion of the touchscreen being controlled by firmware instructions and data loaded into a second portion of the memory of the touchscreen controller.

According to another embodiment, there is provided a capacitive touchscreen system comprising a first plurality of electrically conductive drive electrodes arranged in rows or columns, a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes; sense circuitry operably connected to the second plurality of sense electrodes and configured to sense input signals therefrom, and a touchscreen controller operably connected to the first plurality of drive electrodes and the second plurality of sense electrodes, the touchscreen controller being operably connected to a host processor, the touchscreen controller having computer-readable button group programming instructions and data loaded into a first memory portion thereof from the host processor, the computer-readable button group programming instructions and data comprising steps for sensing and arbitrating among touches occurring on and within a first plurality of buttons, firmware instructions and data being loaded into a second portion of the memory of the touchscreen controller, wherein the first plurality of buttons is arranged in a first group on the touchscreen, the first group is located within a first portion of the touchscreen, and capacitive sensing of touches occurring on and within at least second portions of the touchscreen that are located outside the first portion of the touchscreen are controlled by the firmware instructions.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

FIG. 8 shows another embodiment of a group button diagram;

FIGS. 12 through 17 are flowcharts corresponding to different processes and methods carried out by a touchscreen controller that has received programming instructions and data from a host processor to permit the use of buttons, sliders and groups.

DETAILED DESCRIPTIONS OF SOME EMBODIMENTS

Figure 1:
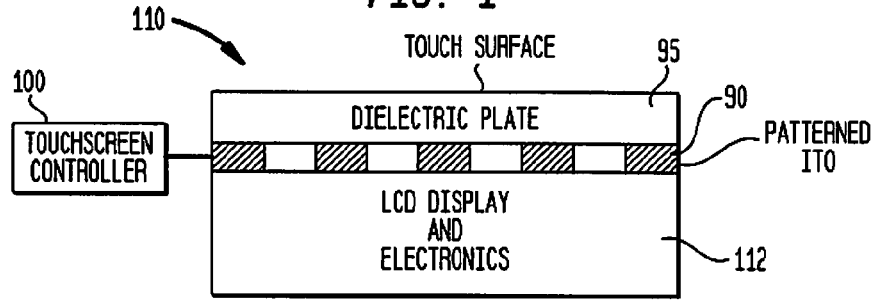
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
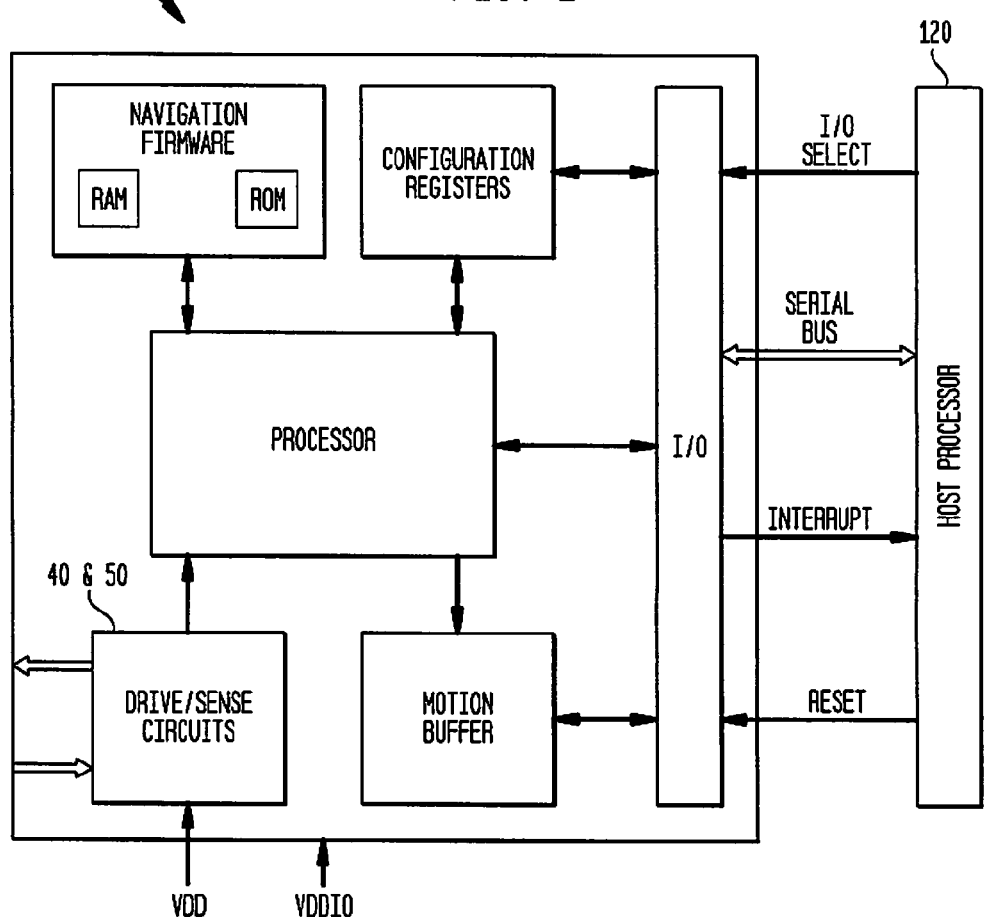
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein, or an Avago Technologies™ AMRI-5200 ASIC or chip 100 for which a corresponding Preliminary Product Data Sheet entitled "AMRI-5200 Low-Power 10-Touch Controller" dated Apr. 20, 2011 filed in an Information Disclosure Statement on even date herewith is hereby incorporated by reference herein in its entirety. In one embodiment, touchscreen controller is a low-power capacitive touch-panel controller designed to provide a touchscreen system with high-accuracy, on-screen navigation.

Figure 3:
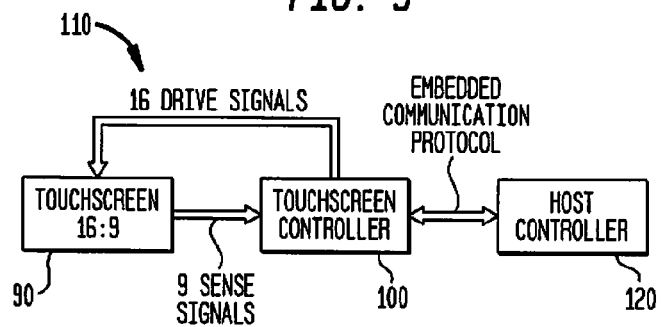
FIG. 3 shows one embodiment of a block diagram of a capacitive touchscreen system and a host controller.
Figure 4:
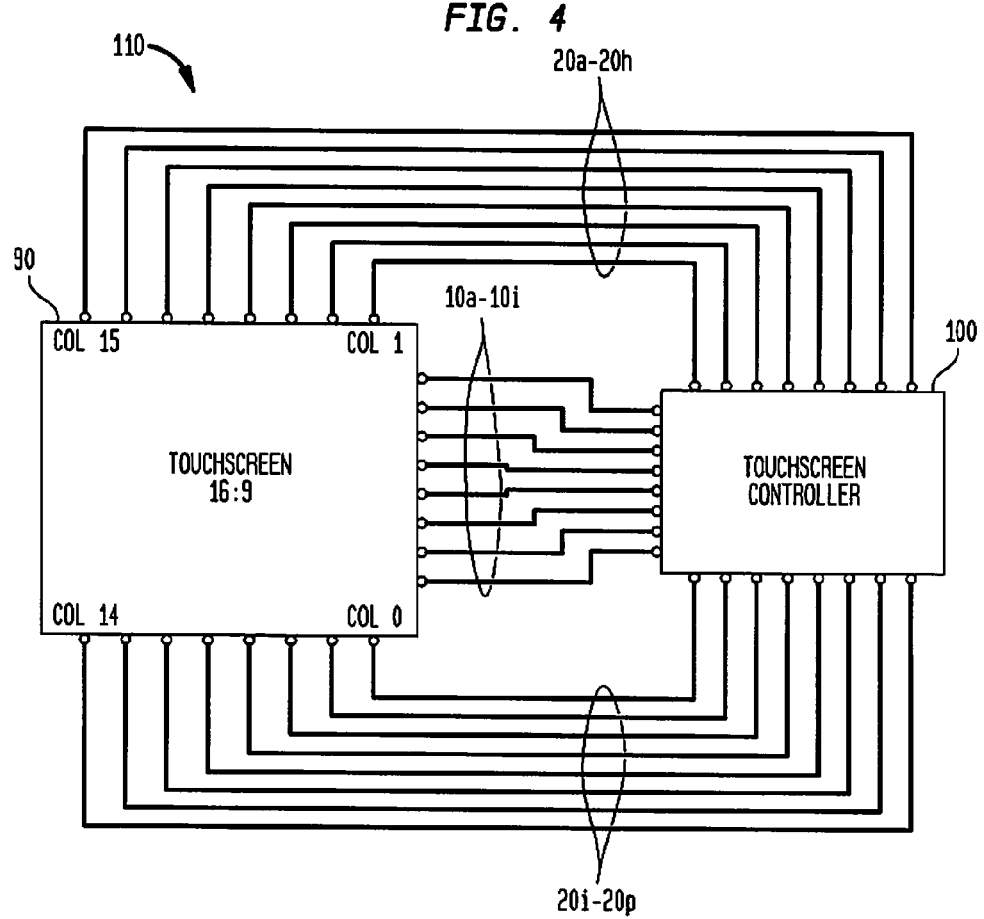
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 16 drive signal lines and 9 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×2 and 12×0 arrays.

Touchscreen controller 100 may feature multiple operating modes with varying levels of power consumption. For example, in rest mode controller 100 may periodically look for touches at a rate programmed by the rest rate registers. There are multiple rest modes, each with successively lower power consumption. In the absence of a touch for a certain interval controller 100 may automatically shift to a lower power consumption mode. However, as power consumption is reduced the response time to touches may increase.

According to one embodiment, and as shown in FIG. 4, an ITO grid or other electrode configuration on touchscreen 90 comprises drive columns 20a-20p and sense rows 10a-10i, where drive columns 20a-20p are operably connected to corresponding drive circuits and rows 10a-10i are operably connected to corresponding sense circuits. One configuration for routing ITO or other lines from drive and sense electrodes to lines to touchscreen controller 100 is shown in FIG. 4.

Those skilled in the art will understand that touchscreen controllers, micro-processors, ASICs or CPUs other than a modified AMRI-5000 or AMRI-5200 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Figure 5:
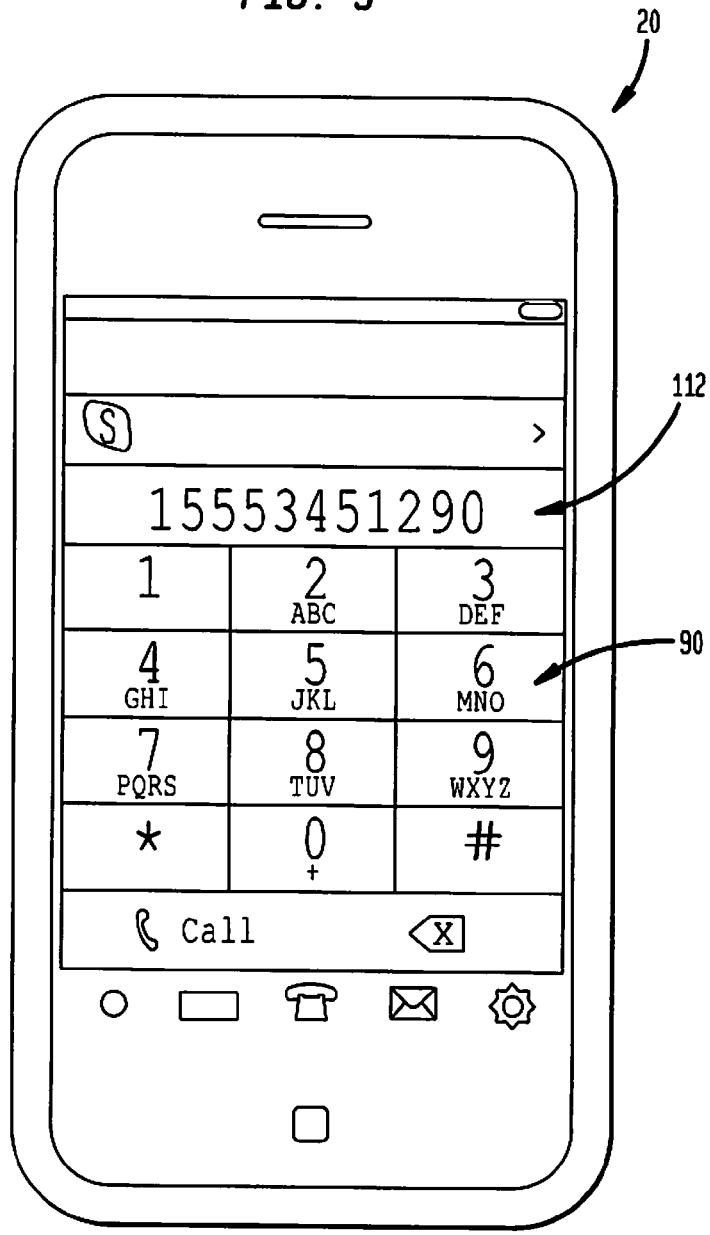
FIG. 5 shows a mobile telephone and accompanying keypad.

Referring now to FIG. 5, there is shown a mobile telephone 20 with capacitive touchscreen 90 and display 112. As described above, there is a risk that a user can accidentally and unintentionally trigger one or more buttons in a capacitive touchscreen device that are adjacent to a button that the user desires to press or touch. One typical approach many capacitive touchscreen devices employ to solve this problem is to search for a button having the strongest touch signal associated therewith, and automatically raise the touch threshold or suppress presses or touches on neighboring buttons. This approach requires, however, that the location of every button be known, as well as the locations of all buttons that are each button's neighbors. As a result, extensive location information must be embedded in the limited memory of the touchscreen controller associated with the device. For example, the pad or touch area "5" shown on the keypad of FIG. 5 would need to know that pads or touch areas "2," "4," "8" and "6" are immediate neighbors thereto that can easily be triggered when pad "5" is being pressed. Moreover, pads or touch areas "1," "3," "7" and "9" are diagonally-situated neighbors that may also be triggered with some ease when pad "5" is being pressed.

As described in detail below, the above problems can be cured by defining pads or touch areas (or "buttons") that are located in close proximity to one another in pre-defined groups. Buttons located in the same group can be configured to apply automatically the suppression of neighboring buttons in the group when one of the buttons in the group is being pressed. Groups can also be indicated to be neighbors to other groups, which may also permit neighboring button suppression in adjacent group(s). Groups can further be indicated to be next to the edge of the main touchscreen, which allows rejection of touches in an edge zone of the touchscreen when a button in the group is being pressed. By defining groups of buttons and the attributes of neighboring buttons, very little location and configuration parameters or data need to be stored in the memory of touchscreen controller 100. These concepts can be employed to save memory in touchscreen controller 100, as well as to simplify the device designer's task since fewer parameters and data need to be defined.

In the discussions that follow below, reference may be made to the above-mentioned Preliminary Product Data Sheet entitled "AMRI-5200 Low-Power 10-Touch Controller" for additional details and information.

Buttons

A button generally looks something like a large touch pad cell. In one embodiment, a button detection algorithm is provided that is a Touch Strength (Z) threshold algorithm with hysteresis. Several different touch algorithms may be associated with buttons, however, more about which is said below.

Cells may be configured such that a pressed button and its neighboring buttons register the same "Z" in response to a touch of the same strength. Different methods to determine which button has registered a touch may be employed. One method is according to the touch which is "first to arrive" or "first in time." A second method is according to relative touch strength "Z." A third method is to report all touches. A fourth method employs a grace period of several frames before a decision is made as t which button has been touched or pressed. The grace period approach permits multiple touches having different touch strengths "Z" to be acquired before determining which touch has the greatest strength.

According to one embodiment, buttons located in the same group are typically exclusive to one another. That is, one pressed button disables the remaining buttons in the group. Groups of buttons can also be configured to have the same or similar threshold and proximity properties.

Because a button press within a group of buttons is capable of excluding other button presses, navigation should generally exclude button presses as well. Such a "proximity" feature can be configured to perform exclusion between buttons touches and navigation screen touches, and vice versa. Button settings may be configured to customize this behavior, including selecting the navigation screen edge (North/South/East/West), and selecting the range along the screen edge.

Figure 6:
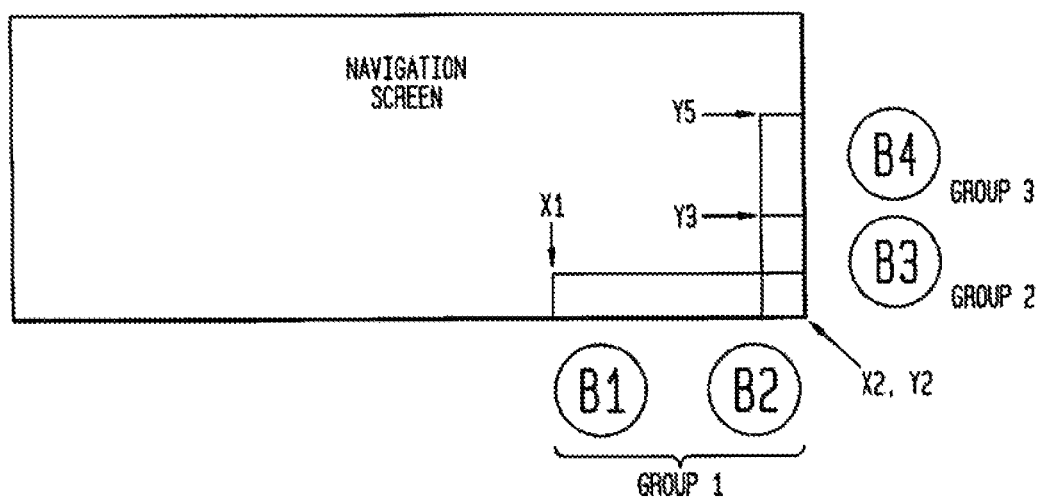
FIG. 6 shows one embodiment of a button group diagram.

Referring now to FIG. 6, there is shown capacitive touchscreen 90 comprising a navigation screen and portions of screen 90 devoted to group 1 (buttons B1 and B2) and group 2 (button B3), and group 3 (button B4). As shown in FIG. 6, buttons B1 and B2 are in group 1. Group 1 is programmed to be exclusive with Group 2, and the navigation screen's south edge is designated to lie between X1 and X2. Button B3 is in group 2. Group 2 is programmed to be exclusive with groups 1 and 3, and the navigation screen's east edge is designated to lie between Y2 and Y3. Button B4 is in group 3. Group 3 is programmed to be exclusive with Group 2, and the navigation screen's east edge is designated to lie between Y3 and Y5. As shown in FIG. 6, the navigation area of touchscreen 90 is the portion of a 20×2 (or other size) frame dedicated to sensing 2-dimensional touches (e.g., some rows may be dedicated to buttons, and some rows may be dedicated to sliders).

According to one embodiment, buttons and sliders may be configured to allow the certain attributes to be specified, such as touch delay (debounce period), auto-repeat, hold-off time, press and release reporting (vs. press-only reporting). In the AMRI-5200 controller, configuration of buttons is accomplished by setting DOWNLOAD_CTL to Initiate Button Configuration. See also Register I/O section DOWNLOAD_CTL (Register 0x0A). Button settings can be saved to flash memory. See FLASH_CTL (Register 0x27). See also the I/O section on motion report and button report.

Sliders

Figure 7:
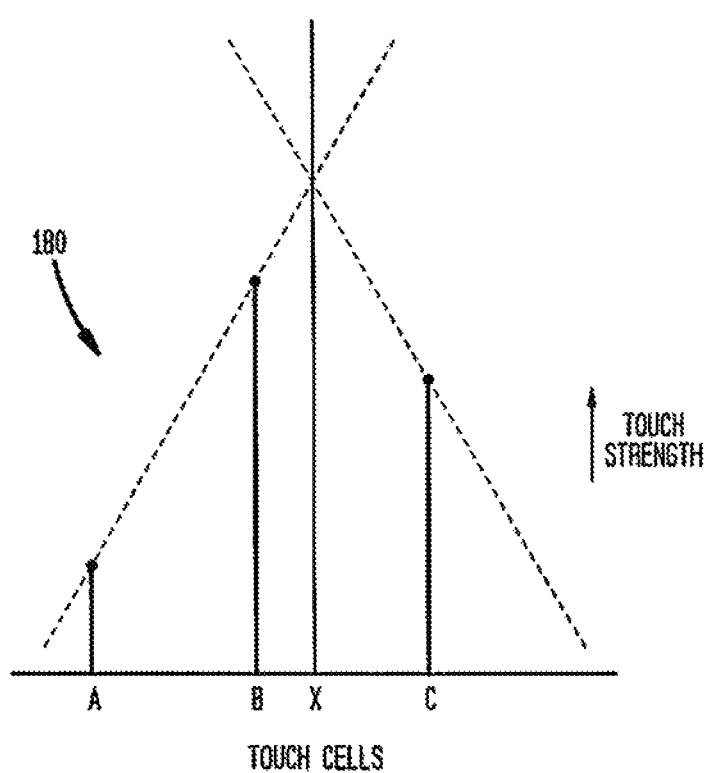
FIG. 7 illustrates one embodiment of a Flying V algorithm.

A slider is a line of touch cells designated as a group, to sense touch and location information in one dimension along a line of cells. According to one embodiment, sliders rely on a "Flying V" algorithm to locate touches using interpolation techniques. The Flying V algorithm is a one-dimensional algorithm that may be applied in two dimensions. The Flying V algorithm interpolates the location of a touch by examining the maximum value of a cell and those of the cell's two neighbors. Referring now to FIG. 7, see touch strengths A, B and C. Logically the true center location should tend towards C. An estimate of this location is calculated by taking the slope between the lesser neighbor (A) and the maximum (B). This steep slope is then applied to the greater neighbor (C). Where the two slopes cross is the interpolated center location (X).

One or more sliders can also be included in the same group as buttons, and can be configured to possess the same attributes as other members of the group. Configuration of sliders in the AMRI-5200 controller is done by setting DOWNLOAD_CTL to Initiate Button Configuration. Slider settings can be saved to Flash. See FLASH_CTL (Register 0x27). See also the I/O section on Motion Report, Button Report, and Slider Report.

Motion Report

In Motion Report, the controller reports what it has detected, typically once-per-frame. The Motion Report is sometimes called a "touch report", but in addition to touch reports, the Motion Report may also contain reports on buttons, sliders, gestures, and haptics. The AMRI-5200 controller is able to support up to 10 touch points, 12 buttons and 4 sliders. A host processor or controller 120 may be configured to receive an interrupt when the Motion Report data is ready to be read, if firmware has set the STATUS_INT_MASK (Register 0x05) bit Motion Data Ready ($SIM_4$). The Host can then read the Motion Report by successively reading bytes out of MOTION_REPORT_DAT (Register 0x1F). The data within the Motion Report is not fixed. The Host can be configured to change the reporting order of its contents, and to inhibit or enable portions of the Motion Report. Also, the sizes of some fields within the report may be subject to the amount of data available to report. When Done reading the Motion Report, the host processor should mark the Motion Report read by setting MOTION_REPORT_CTL (Register 0x1E) bit $MRC_7$. The Motion Report data are internally double buffered so that navigation can be performed while a Motion Report is being read. According to one embodiment, the Motion Report buffer is 92 bytes long. If this length is exceeded, the last data will be lost. The total amount of space used is:

1 byte status
9 bytes per touch point+1
3 bytes per button+1
5 bytes per slider+1
8 bytes for gesture+1
4 or 9 bytes for haptics+1

According to one embodiment, when using default settings only Touch Points are enabled. As a result, the default Motion Report contains only a byte of status and the touch point report:

| Address | Description |
| --- | --- |
| 0x00 | Out Reg Status |
| 0x01-0x * | Touch Point Report |

* Address depends on the variable length of each field

Touch points, buttons, sliders, gestures, and haptics can all be enabled and disabled. In the AMRI-5200 controller, touch point reporting can be disabled by MOTION_REPORT_CTL (Register 0x1E) bit disable touch point and hover touch point reporting ($MRC_{[5:4]}$). Button and slider reporting can be enabled by BUTTON_CONTROL (Register 0x78) bit BUTTONS/SLIDERS ($BTNC_0$). Gesture reporting can be enabled individually by GESTURE_SELECT (Register 0x6C) bits ($GSTS_{[7:0]}$). Haptic reporting can be enabled by HAPTIC (Register 0x77) bits MODE ($HAP_7$) and REPORT_HAPTIC ($HAP_{[6:5]}$).

With all fields enabled and the default reporting order, the Motion Report contains a status byte, followed by all the Reports. The Motion Report may be formatted as follows:

| Address | Description |
| --- | --- |
| 0x00 | Out Reg Status |
| 0x01-0x * | Touch Point Report |
| 0x *-0x * | Button Report |
| 0x *-0x * | Slider Report |
| 0x *-0x * | Gesture Report |
| 0x *-0x * | Haptic Report |

* Address depends on the variable length of each field

The order of these reports can be changed from the default. This can be accomplished by modifying MOTION_REPORT_CONTROL (Register 0x1E) bits REPORTING_ORDER ($MRC_{[5:4]}$) and GESTURE_CONTROL (Extended Register 0x27) bit GESTURES_FIRST ($GSTC_7$).

Before discussing the format of each Report type in the next few sections, we note that the terms touch strength, force, and Z may be used interchangeably throughout report format descriptions.

Touch Point Report

According to one embodiment, the touch point report consists of a touch point header followed by 0 to 10 touch point records, depending on the number of points being reported. Note also that touch points can be sorted by ID (ascending) or by force (Z) (descending) according to the setting of MOTION_REPORT_CTL (Register 0x1E) bit primary sort ($MRC_0$).

Touch Point Header:

| Address | Description |
| --- | --- |
| 0x00 | Points |

Touch Point Record (Variable Number Depending on Points):

| Address | Description |
| --- | --- |
| 0x00 | Touch Point ID |
| 0x01 | X Lo |
| 0x02 | X Hi |
| 0x03 | Y Lo |
| 0x04 | Y Hi |
| 0x05 | Z Lo |
| 0x06 | Z Hi |
| 0x07 | Area Lo |
| 0x08 | Area Hi |

Button Report

A button report consists of a button header followed by 0 to 12 button records, depending on the button count being reported.

Button Header:

| Address | Description |
| --- | --- |
| 0x00 | Button Count |

Button Record (Variable Number Depending on Button Count):

| Address | Description |
| --- | --- |
| 0x00 | Button ID |
| 0x01 | Z Lo |
| 0x02 | Z Hi |

Slider Report

The slider report consists of a slider header followed by 0 to 4 slider records, depending on the slider count being reported.

Slider Header:

| Address | Description |
| --- | --- |
| 0x00 | Slider Count |

Slider Record (Variable Number Depending on Slider Count):

| Address | Description |
| --- | --- |
| 0x00 | Slider ID |
| 0x01 | Z Lo |
| 0x02 | Z Hi |
| 0x03 | Position Lo |
| 0x04 | Position Hi |

I/O Download

In the register I/O section DOWNLOAD_CTL (Register 0x0A) of the AMRI-5200 controller, the register map contains an I/O download port, which is downloaded a byte-at-a-time into DOWNLOAD_DATA (Register 0x0B). The data are downloaded into the RAM area, which is the working location where the firmware expects to find the data. In this area, the data are volatile and subject to being lost when power is removed. After the user has determined the data are valid and wants the data to remain non-volatile, a register bit may be set that causes the firmware to save the data into a flash memory or area so they remain safe from power loss. On power-up or reset, the firmware then restores the downloaded RAM area data from the flash memory so that downloaded data may be used by the firmware to create the desired operation behavior for the user.

The download mechanism follows a similar process. The Watchdog is turned off during a download. In the AMRI-5200 this is done by setting WD_DISABLE (Register 0x7D) to disable watchdog (0xAD). To get a valid configuration file download status, it is recommended to clear BOOT_STAT (Register 0x03) bits to all 0 (0x00). The download type can now be selected. This can be done by setting DOWNLOAD_CTL (Register 0x0A) to the desired I/O Download type. See also DOWNLOAD_CTL (0x0A).

Generally, a delay of 1 millisecond is employed before continuing so the AMRI-5200 controller is ready to receive data. This can be done by reading DOWNLOAD_CTL (Register 0x0A) and waiting for Download Not Busy (DLC$_7$=0). Next, a delay of 100 microseconds is employed before continuing and writing data bytes to DOWNLOAD_DATA (Register 0x0B). A delay 10 microseconds is employed between each byte. Writing data bytes is repeated until complete. When the I/O download is complete, the non-configuration file download status is checked. BOOT_STAT (Register 0x03) bit, Configuration File Download Successful (B_STAT$_6$=1), should eventually appear. Now the Watchdog Timer can be turned back on. This is done by setting WD_DISABLE (Register 0x7D) to enable watchdog (0x00).

Download errors are reported in the Error ID register to provide feedback on correcting the order or format of the downloaded data. After the downloaded data have been tested and validated, the user may set a register to instruct the firmware to save the table of data into flash memory.

---

ERROR_ID

---

Access: Read only Reset Value: 0x00
Bit      7    6    5    4    3    2    1    0
Field                    Range: 0x01-0x24
Data Type: Eight-bit number
USAGE: Error ID. This register display the error ID value when an error has occurred as indicated by STATUS register bit[0]. Value will self clear after being read.

| Value | Description |
|---|---|
| 0x01 | Firmware watchdog error |
| 0x02 | Internal Hardware timeout failure |
| 0x03 | Host missed motion report read |
| 0x04 | Communication overrun |
| 0x05 | Bad motion report configuration |
| 0x06 | Hard fault * |
| 0x07 | Bad frame buffer index |
| 0x08 | Flash programming error |
| 0x09 | Flash not ready error |
| 0x0A | Flash erase parameter error |
| 0x0B | Flash page erase failed |
| 0x0C | Flash update page size too large |
| 0x0D | Flash update address goes beyond page |
| 0x0E | Flash code and ROM mismatched |
| 0x0F | Flash code bad CRC |
| 0x10 | Flash customer data corrupt |
| 0x11 | Flash calibration data corrupt |
| 0x12 | Flash drive/sense data corrupt |
| 0x13 | Flash delta data corrupt |
| 0x14 | Flash haptic data corrupt |
| 0x15 | Flash button/slider data corrupt |
| 0x16 | Download button/slider/haptic data length wrong |
| 0x17 | Download button/slider/haptic page exceeded |

-continued

| Value | Description |
|---|---|
| 0x18 | Download button/slider/haptic termination byte mismatch |
| 0x19 | Download haptic data size or signature wrong |
| 0x1A | Download button data counts exceeded |
| 0x1B | Download button group counts exceeded |
| 0x1C | Download button device count mismatch |
| 0x1D | Download button signature wrong |
| 0x1E | Download button group device count wrong |
| 0x1F | Download button group position count wrong |
| 0x20 | Download button valid cell number exceeded |
| 0x21 | Download slider position count wrong |
| 0x22 | Download slider valid cell number exceeded |
| 0x23 | Flash customer data larger than the data storage space |
| 0x24 | Flash program buffer full when additional data arrived |
| 0x25 | Download Group has T2 = T3. |
| 0x26 | Download Device has bit 5 (button bit) not set. |
| 0x27 | Download Group Devices (count) does not match. |
| 0x28 | Download Group Devices NextTo[x] index out of range. |

The type of data downloaded (selected by DOWNLOAD_CTL) may assume various formats or structures.

Referring now to FIG. 8, there is shown another embodiment of a group button diagram that is described in detail below with accompanying illustrative examples. In FIG. 8, group 0 has member button 0x20 and neighbor group 1. Group 1 has member buttons 0x1-0x3, neighbors group 0 and group 2, and screen edge of concern between x values of 131 and 291 (in pixels). Group 2 contains member button 0x4 and member slider 0x1, and has neighbors of group numbers 1-9 representing equivalent cell numbers used in the buttons and slider.

Continuing to refer to FIG. 8, there is shown one example of a touch panel allocated into 2 areas: one area for touch point tracking (the navigation touch panel area) and a second area for buttons and a slider located below the navigation touch panel area. As a first step, both areas of the touch panel are physically laid out with capacitive cells in the example arrangement shown above. The technology details of capacitive touch cells are outside the scope of this example and utilize typical industry trends in touch panel layout.

In the example of FIG. 8, the navigation touch panel area consists of a mesh of smaller capacitive cells arranged in a regular X-Y grid pattern. The buttons and slider area cells in groups 0, 1, and 2 are typically larger capacitive cells identified visually to the user as buttons or slider by some means. Such means might be, by way of example, silkscreen markings to outline the buttons and sliders or the use of screen graphics to draw icons under the capacitive cells, etc. From a designer's perspective, buttons and sliders in the example of FIG. 8 are identified as belonging to 3 groups based on their relatively close proximity to neighboring buttons. The grouping shown in FIG. 8 need not be made visible to the user, however. Note that in the description below and in FIG. 8, the notation "0x" simply means that subsequent digits are in hexadecimal (base 16) notation or format.

Group 0 contains 1 button: ID=0x0, cell number 1 (equivalent cell). Group 1 contains 3 buttons: ID=0x1, 0x22, 0x3, with cell numbers 2, 3, 4. Group 2 contains 1 button (ID=0x4) and 1 slider (ID=0x1). Button ID 0x4 uses cell 5 and slider ID 0x1 uses cells 6, 7, 8, 9. Note that Group 0 is in close proximity to Group 1, and so specifies Group 1 as its neighbor. Group 1 is in close proximity to Group 0, Group 2, and a bottom touch panel edge of concern between X=131 and X=291 (horizontal pixel positions). Group 1 specifies its neighbors as Group 0 and Group 2 and specifies these minimum and maximum "screen" edge dimensions associated with the bottom edge of the screen. Group 2 is only in close proximity with Group 1, and so specifies Group 1 as its neighbor. Within each group, only one of its members is allowed to report as having been pressed (even when touch contact occurs across several members in the group).

Touch Scenarios and Intended Exclusions

There are a number of touch scenarios for the example grouping shown in FIG. 8. A trivial example is Group 0 being touched first and excluding a second touch being recognized in Group 1 during the period of time Group 0 is still being touched. However, a touch in Group 2 would be allowed even if Group 0 were still being touched. Similarly, a touch in Group 2 first would also exclude a second touch in Group 1 until the touch in Group 2 was removed. The touch in Group 2 would not exclude Group 0 from recognizing and reporting a touch. Group 0 and Group 2 can therefore report simultaneously (as long as one of them were touched first before Group 1). Furthermore, Group 1 is "blocked" from reporting as long as that touch is maintained in either Group 0 or Group 2. No screen edge is specified for exclusion when either Group 0 or Group 2 are touched so the user can expect any touch points on the Navigation Touch Point Area to always report those touches while Group 0 or Group 2 are touched. Group 1 specifies a screen edge of the touch panel between X=131 and X=291 to not report touches if Group 1 is touched first (and before any touches on this part of the Navigation Touch Point Area). If Group 1 is touched first, neither Group 2, nor Group 0, nor the screen edge between X=131 and X=291 are allowed to report touches until touch contact is removed from Group 1, including any hold-off period specified in each of those other groups.

How to Specify Behavior

A user creates a download table of bytes representing button and slider configurations. In the example of FIG. 8, 5 buttons and 1 slider are to be specified. The default shared selection criteria (first to be pressed, or maximum strength of signal) can be specified in the Button Control parameter at Index 0x8. This parameter can also be modified later outside of this table, allowing the changing of selection criteria without loading a different download table. This parameter is also responsible for the desired "release" behavior ("static" release of all members and neighbors required before new press recognized, or "dynamic" release for hold-off time plus touch delay time before new press recognized). The "static" release typically requires a user's finger to be "lifted" off the screen for subsequent recognition of a button or slider press in the group or neighboring group. The "dynamic" release allows the user to slide a finger from one button to another without lifting the finger and the next button is allowed to report a touch after any specified of hold-off delay plus touch delay.

Example Table of Download Entries

Values shown below are in hexadecimal bytes, with comments shown following a # marker. In an actual download file, the comments, empty lines and # markers would be stripped off first before downloading the stream of bytes to the download register of the AMRI-5200 controller. The entire download table is shown in the AMRI-5200 specification as follows. Index 0 in the following table follows a pre-amble block consisting of command byte, reserve flag byte, lower byte count and upper byte count:

Pre-Amble Block (4 Bytes)

2A # command indicating button/slider table download
00 # reserve flag byte—always 00
6E # lower byte of count of all bytes being downloaded starting from "2A"
01 # upper byte of count of all bytes, e.g., 0x017A=378 bytes downloaded
All subsequent entries in the table are in the following format, starting with Index 0x00:

Configuration Table Overview

The Button/Slider Configuration table consists of 439 bytes max (0x1B7 bytes in hexadecimal). All of the byte values should be in hexadecimal (base 16) format. Some of the bytes are bit fields where each of the 8 bits of the bytes is either a true/false selector of some option or reserved for future use (a bit to be left in the "0" state). Some of the bytes are part of a 2 byte field broken into a "low byte" followed by a "high byte". In these cases, a numeric value such as 291 decimal, converted to 0x23 in hexadecimal (or 123 hex without the "0x" hexadecimal indicator) would be broken into a "low byte" of 23 followed by the "high byte" of 01 when entering the values into the table. The word "Device" in this table refers to "Button or Slider".

The process of filling in the Button/Slider Configuration table is broken into sections or blocks as follows:
 1) General Settings Block (14 bytes, Indexes 00-0D)
 2) Device n Block (128 bytes, Indexes 0E-8D)
 3)—Padding Out Unused Bytes (of Device n Block)
 4) Group Devices Block (10 bytes, Indexes 8E-97)
 5) Group n Block (200 bytes, Indexes 98-15F)
 6)—Padding Out Unused Bytes (of Group n Block)
 7) Slider n Block (88 bytes, Indexes 160-1B7)

Each block will delve into the register descriptions related to that block, so it will be useful to refer back to this list and the table immediately below to not get too lost in the details.

Button/Slider Configuration

| Index | Description |
|---|---|
| 0x00 | Valid Buttons Lo = 0xAB |
| 0x01 | Valid Buttons Hi = 0xCD |
| 0x02 | Max Buttons (number of buttons to configure) |
| 0x03 | Max Sliders (number of sliders to configure) |
| 0x04 | Max Devices (sum of Max Buttons plus Max Sliders) |
| 0x05 | Max Groups (number of groups to configure) |
| 0x06 | Reserved (leave as "00") |
| 0x07 | Reserved (leave as "00") |
| 0x08 | Button Control (bitfield of selection criteria for buttons/sliders) |
| 0x09 | Button Control 2 (bitfield of options for buttons/sliders) |
| 0x0A | Reserve (set to 0xFF) |
| 0x0B | Button Count Void (number of buttons/sliders to inhibit all) |
| 0x0C | Cheek Device Enable Bits (option bits in cheek mode) |
| 0x0D | Button Select Delay (only for Max Z case - synchronization) |
| 0x0E-0x15 | Device 0 (refer to separate table "DEVICE n") |
| 0x16-0x1D | Device 1 |
| 0x1E-0x25 | Device 2 |
| 0x26-0x2D | Device 3 |
| 0x2E-0x35 | Device 4 |
| 0x36-0x3D | Device 5 |
| 0x3E-0x45 | Device 6 |
| 0x46-0x4D | Device 7 |
| 0x4E-0x55 | Device 8 |
| 0x56-0x5D | Device 9 |

| Index | Description |
|---|---|
| 0x5E-0x65 | Device 10 |
| 0x66-0x6D | Device 11 |
| 0x6E-0x75 | Device 12 |
| 0x76-0x7D | Device 13 |
| 0x7E-0x85 | Device 14 |
| 0x86-0x8D | Device 15 |
| 0x8E | Group Devices 0 (number of devices in Group 0) |
| 0x8F | Group Devices 1 (number of devices in Group 1) |
| 0x90 | Group Devices 2 (number of devices in Group 2) |
| 0x91 | Group Devices 3 (number of devices in Group 3) |
| 0x92 | Group Devices 4 (number of devices in Group 4) |
| 0x93 | Group Devices 5 (number of devices in Group 5) |
| 0x94 | Group Devices 6 (number of devices in Group 6) |
| 0x95 | Group Devices 7 (number of devices in Group 7) |
| 0x96 | Group Devices 8 (number of devices in Group 8) |
| 0x97 | Group Devices 9 (number of devices in Group 9) |
| 0x98-0xAB | Group 0 (refer to separate table "GROUP n") |
| 0xAC-0xBF | Group 1 |
| 0xC0-0xD3 | Group 2 |
| 0xD4-0xE7 | Group 3 |
| 0xE8-0xFB | Group 4 |
| 0xFC-0x10F | Group 5 |
| 0x110-0x123 | Group 6 |
| 0x124-0x137 | Group 7 |
| 0x138-0x148 | Group 8 |
| 0x14C-0x15F | Group 9 |
| 0x160-0x175 | Slider 0 (refer to separate table "SLIDER n") |
| 0x176-0x18B | Slider 1 |
| 0x18C-0x1A1 | Slider 2 |
| 0x1A2-0x1B7 | Slider 3 |

Device n (0x0E-0x16 to 0x6-0x8D):

| Index | Description |
|---|---|
| 0x0E + n × 8 | ID (value from hex 20 to hex 3F identifying device) |
| 0x0F + n × 8 | Device Config (bit field of option specific to this device) |
| 0x10 + n × 8 | Touch Delay (debounce period in 6.7 ms frame cycles) |
| 0x11 + n × 8 | Holdoff (hold-off period in 6.7 ms frame cycles) |
| 0x12 + n × 8 | Group (option group associated with this device) |
| 0x13 + n × 8 | Padding (leave as 0x00) |
| 0x14 + n × 8 | Cell Number or cell Count (button cell number or slider counts) |
| 0x15 + n × 8 | Padding (leave as 0x00) |

Group n (0x8-0x1 to 0x62-0x67):

| Index | Description |
|---|---|
| 0x78 + n × 32 | T1 Lo ("release" threshold lower byte) |
| 0x79 + n × 32 | T1 Hi ("release" threshold upper byte) |
| 0x7A + n × 32 | T2 Lo ("press" threshold lower byte) |
| 0x7B + n × 32 | T2 Hi ("press" threshold upper byte) |
| 0x7C + n × 32 | Edge Min Lo (starting point of panel edge exclusion - lo byte) |
| 0x7D + n × 32 | Edge Min Hi (starting point of exclusion in pixels - hi byte) |
| 0x7E + n × 32 | Edge Max Lo (ending point of panel edge exclusion - lo byte) |
| 0x7F + n × 32 | Edge Max Hi (ending point of exclusion in pixels - hi byte) |
| 0x80 + n × 32 | Group Config (bit field options for this group) |
| 0x81 + n × 32 | Group Positions (number of group neighbors to this group) |
| 0x82 + n × 32 | Next To 0 (first neighbor group to this group) |
| 0x83 + n × 32 | Next To 1 (second neighbor group to this group) |
| 0x84 + n × 32 | Next To 2 (etc.) |
| 0x85 + n × 32 | Next To 3 |
| 0x86 + n × 32 | Next To 4 |
| 0x87 + n × 32 | Next To 5 |
| 0x88 + n × 32 | Next To 6 |
| 0x89 + n × 32 | Next To 7 |
| 0x8A + n × 32 | Next To 8 |
| 0x8B + n × 32 | Next To 9 |

Slider n (0x7C-0x85 to 0x19A-0x1A3):

| Index | Description | |
|---|---|---|
| 0x17C + n × 22 | Record Width Lo (pixel width of slider cell—lo byte) | |
| 0x17D + n × 22 | Record Width Hi (pixel width of slider cell—hi byte) | |
| 0x17E + n × 22 | Cell 0 | (first cell of slider) |
| 0x17F + n × 22 | Padding (leave as 0x00) | |
| 0x180 + n × 22 | Cell 1 | (second cell of slider) |
| 0x181 + n × 22 | Padding (leave as 0x00) | |
| 0x182 + n × 22 | Cell 2 | (third cell of slider) |
| 0x183 + n × 22 | Padding (leave as 0x00) | |
| 0x184 + n × 22 | Cell 3 | (etc.) |
| 0x185 + n × 22 | Padding (leave as 0x00) | |
| 0x186 + n × 22 | Cell 4 | |
| 0x187 + n × 22 | Padding (leave as 0x00) | |
| 0x188 + n × 22 | Cell 5 | |
| 0x189 + n × 22 | Padding (leave as 0x00) | |
| 0x18A + n × 22 | Cell 6 | |
| 0x18B + n × 22 | Padding (leave as 0x00) | |
| 0x18C + n × 22 | Cell 7 | |
| 0x18D + n × 22 | Padding (leave as 0x00) | |
| 0x18E + n × 22 | Cell 8 | |
| 0x18F + n × 22 | Padding (leave as 0x00) | |
| 0x190 + n × 22 | Cell 9 | |
| 0x191+ n × 22 | Padding (leave as 0x00) | |

Referring back to the table:
1) General Settings Block (14 bytes, Indexes 00-0D)
2) Device n Block (128 bytes, Indexes 0E-8D)
3)—Padding Out Unused Bytes (of Device n Block)
4) Group Devices Block (10 bytes, Indexes 8E-97)
5) Group n Block (200 bytes, Indexes 98-15F)
6)—Padding Out Unused Bytes (of Group n Block)
7) Slider n Block (88 bytes, Indexes 160-1B7)
General Settings Block (14 Bytes, Indexes 0x00 to 0x0D)
Now we enter general settings applying to Buttons and Sliders and their behavior.
This corresponds to filling in the first 14 bytes of the table above for Example 3, sequentially as follows:
AB # Valid Buttons reserved signature byte—always AB
CE # Valid Buttons reserved signature byte—always CE
05 # Max Buttons—number of buttons to be configured (5 buttons total in all groups)
01 # Max Sliders—count of number of sliders to be configured (1 slider)
06 # Max Devices—sum of number of buttons+sliders (5+1=6)
03 # Max Groups count of number of groups to be configured (3 groups)
00 # Sense Button Slider 1 reserve byte—leave as 00
00 # Sense Button Slider 2 reserve byte—leave as 00
41 # Button Control—selection criteria: "max Z" (see register description below)
00 # Button Control—default optional control settings (see register description below)
FF # Reserved—leave as FF
FE # Button Count Void setting—leave as FE to disable this feature (see register)
00 # Cheek Device Enable Bits option (see description of CheekBits register)
00 # Button Select Delay "gracePeriod" option (see description: GracePeriod register Here are detailed definitions for each registers:

---

VALID_BUTTONS_LO  Index: 0x00

Access: Write Only  Default Value: 0xAB
Bit  7  6  5  4  3  2  1  0
Field
Data Type: Lower eight bits [7:0] of a sixteen-bit number; see also 0x01.

---

VALID_BUTTONS_HI  Index: 0x01

Access: Write Only  Default Value: 0xCE
Bit  7  6  5  4  3  2  1  0
Field
Data Type: Upper eight bits [15:8] of a sixteen-bit number
USAGE: This word pattern tags that the I/O Download data as of the Buttons type. This value must be 0xCEAB to be recognized.

---

MAX_BUTTONS  Index: 0x02

Access: Write Only  Default Value: 0x0C
Bit  7  6  5  4  3  2  1  0
Field  Range: 0x00-0x0C
Data Type: Eight-bit number
USAGE: This register contains the number of Buttons that will be configured.

---

MAX_SLIDERS  Index: 0x03

Access: Write Only  Default Value: 0x04
Bit  7  6  5  4  3  2  1  0
Field  Range: 0x00-0x04
Data Type: Eight-bit number
USAGE: This register contains the number of Sliders that will be configured.

---

MAX_DEVICES  Index: 0x04

Access: Write Only  Default Value: 0x10
Bit  7  6  5  4  3  2  1  0
Field  Range: 0x00-0x10
Data Type: Eight-bit number
USAGE: This register contains the number of Devices (Buttons + Sliders) that will be configured.

---

MAX_GROUPS  Index: 0x05

Access: Write Only  Default Value: 0x0A
Bit  7  6  5  4  3  2  1  0
Field  Range: 0x00-0x0A
Data Type: Eight-bit number
USAGE: This register contains the number of Groups that will be configured.

---

BUTTON_CONTROL  Index: 0x08

Access: Write Only  Default Value: 0x00
Bit  7  6  5  4  3  2  1  0
Field  $BTNC_7$  $BTNC_6$  $BTNC_5$  $BTNC_4$  $BTNC_3$  $BTNC_2$  $BTNC_1$  $BTNC_0$
Data Type: Bit Field
USAGE: Used to configure Button behavior settings.

| Field Name | Description |
| --- | --- |
| $BTNC_{[7:6]}$ | Buttons/Sliders<br>00 = Report all (or group controls).<br>01 = Max Z of all devices. $BTNC_4$ decides the release behavior.<br>10 = First press of all devices. $BTNC_4$ decides the release behavior. |
| $BTNC_5$ | Group Mode<br>0 = Disable Group Mode (groupings not considered).<br>1 = Enable Group Mode (groups considered in selection) |
| $BTNC_4$ | Static Release<br>0 = Disable Static Release<br>1 = Enable Static Release. |
| $BTNC_3$ | Lock out new touch points on panel when buttons/slider touched<br>0 = Disable Lockout.<br>1 = Enable Lockout. |
| $BTNC_2$ | Releases Global Disable<br>0 = Releases enabled if individual Device Config bit 1 is set.<br>1 = Disable All Releases. |
| $BTNC_1$ | Repeats Global Disable<br>0 = Repeats enabled if individual Device Config bit 6 is set.<br>1 = Disable All Repeats. |
| $BTNC_0$ | Buttons/Sliders<br>0 = Disable Buttons and Sliders.<br>1 = Enable Buttons and Sliders. |

---

BUTTON_CONTROL_2  Index: 0x09

Access: Write Only  Default Value: 0x00
Bit  7  6  5  4  3  2  1  0
Field  Reserved  Reserved  Reserved  $BTC2_4$  $BTC2_3$  $BTC2_2$  $BTC2_1$  $BTC2_0$
Data Type: Bit Field USAGE: Used to configure button behavior settings.

| Field Name | Description |
|---|---|
| $BTC2_4$ | Update Global Max Z<br>0 = No Operation<br>1 = Allow updating global Max Z with Button Max Z. This is to consider Buttons touch strength for Operating Mode decisions. |
| $BTC2_3$ | Edge Disable<br>0 = Disable Lockout.<br>1 = Do not check local screen Edge in Max Z of group. Overrides download settings. |
| $BTC2_2$ | Slider Interpolation Disable<br>0 = Enable Slider Interpolation.<br>1 = Disable all Slider Interpolation. The Slider cell index is reported instead. |
| $BTC2_1$ | Slider Hold Delay<br>0 = Hold last Slider position from 3-4 samples ago.<br>1 = Hold last Slider position from 5-8 samples ago. |
| $BTC2_0$ | Slider Hold Disable<br>0 = Hold last Slider position on release (which last Slider position is chosen by $BTC2_1$).<br>1 = Use very last raw Slider position. |

---

BUTTON_COUNT_VOID                Index: 0x0B

Access: Write Only Default Value: 0xFE
| Bit | 7 | 6 | 5 | 4 | 3 | 2 | 1 | 0 |
|---|---|---|---|---|---|---|---|---|
| Field | | | | Range: 0x00-0xFE | | | | |

Data Type: Eight-bit number
USAGE: The Count of Buttons with Touch Strength above T2 to invalidate all Buttons. A value of 0xFE disables this feature.

---

GRACE_PERIOD                Index: 0x0D

Access: Write Only Default Value: 0x00
| Bit | 7 | 6 | 5 | 4 | 3 | 2 | 1 | 0 |
|---|---|---|---|---|---|---|---|---|
| Field | | | | Range: 0x00-0x7F | | | | |

Data Type: Eight-bit number
USAGE: Host chosen Grace Period for Max Z devices. This is the number of frames to evaluate before deciding which button is reported. The button with the Max Z during this Period is reported. A value of 0 disables this feature.

---

CHEEK_BITS                Index: 0x0C

Access: Write Only Default Value: 0x00
| Bit | 7 | 6 | 5 | 4 | 3 | 2 | 1 | 0 |
|---|---|---|---|---|---|---|---|---|
| Field | Reserved | $CHKB_6$ | $CHKB_5$ | $CHKB_4$ | $CHKB_3$ | $CHKB_2$ | $CHKB_1$ | $CHKB_0$ |

Data Type: Bit Field
USAGE: Even with a cheek detection, (i.e., Phone to the ear), we sometimes want to allow some buttons enabled (Volume). This bit field allows some buttons and a slider to remain enabled during a Cheek detection.

| Field Name | Description |
|---|---|
| $CHKB_6$ | Cheek Slider 0<br>0 = Normal Operation.<br>1 = Allow Slider 0 during Cheek. |
| $CHKB_5$ | Cheek Button 5<br>0 = Normal Operation.<br>1 = Allow Button 5 during Cheek. |
| $CHKB_4$ | Cheek Button 4<br>0 = Normal Operation.<br>1 = Allow Button 4 during Cheek. |
| $CHKB_3$ | Cheek Button 3<br>0 = Normal Operation.<br>1 = Allow Button 3 during Cheek. |
| $CHKB_2$ | Cheek Button 2<br>0 = Normal Operation.<br>1 = Allow Button 2 during Cheek. |
| $CHKB_1$ | Cheek Button 1<br>0 = Normal Operation.<br>1 = Allow Button 1 during Cheek. |
| $CHKB_0$ | Cheek Button 0<br>0 = Normal Operation.<br>1 = Allow Button 0 during Cheek. |

Referring back to the table:
1) General Settings Block (14 bytes, Indexes 00-0D)
2) Device n Block (Indexes 0E-8D)
3)—Padding Out Unused Bytes (of Device n Block)
4) Group Devices Block (10 bytes, Indexes 8E-97)
5) Group n Block (200 bytes, Indexes 98-15F)
6) Padding Out Unused Bytes (of Group n Block)
7) Slider n Block (88 bytes, Indexes 160-1B7)
Device n Blocks (8 Bytes Per Button or Slider)
(Entire section contains 16 "devices" or 16x=128 bytes or hex 80 bytes)

Device n Block

The word "Device" in this table refers to "Button or Slider". There are 16 "devices" of 8 bytes each labeled "Device n" where n is a value from 0 to 15 for each of the up to 16 devices (up to 12 buttons max plus up to 4 sliders). Each of these blocks configures 1 button or 1 slider. All buttons (if any) are always listed first, before any sliders. There must not be any empty blocks between the last button block and the first slider block (if any). Each of these "Device" blocks has an ID value identifying the button or slider, such as 21 in hexadecimal followed by a bit field byte called the Device Config for that button or slider. The rest of the 8 byte "Device n" block is described in the separate table below called "Device n". One thing to note is the Cell Number or Cell Count byte. If a button is specified, this byte refers to the equivalent cell number corresponding to this button (see description at the end of this document called "Equivalent Cell Number"). If a slider is specified, this byte refers to the number of cells in the slider (the number of "segments" or steps in the slider). Actual cell numbers for sliders are specified in the "Slider n" block below.

| Index | Description |
| --- | --- |
| 0x0E + n × 8 | ID (value from hex 20 to hex 3F identifying device) |
| 0x0F + n × 8 | Device Config (bit field of option specific to this device) |
| 0x10 + n × 8 | Touch Delay (debounce period in 6.7 ms frame cycles) |
| 0x11 + n × 8 | Holdoff (hold-off period in 6.7 ms frame cycles) |
| 0x12 + n × 8 | Group (option group associated with this device) |
| 0x13 + n × 8 | Padding (leave as 0x00) |
| 0x14 + n × 8 | Cell Number or cell Count (button cell number or slider counts) |
| 0x15 + n × 8 | Padding (leave as 0x00) |

We define each individual button configuration. Each button or slider requires 8 bytes in this section to configure it. The ordering of the buttons and/or sliders in this list suggests an implicit prioritization in the event of a "tie" in meeting criteria for selection—the earliest in this list will be selected in the event of a "tie" in first to be pressed, for example. Ties are generally rare because it would mean more
than 1 button would have achieved a threshold in the same exact sample window (generally 6.7 ms). Sliders follow buttons (if any) in the list.
20 # ID of $1^{st}$ button: valid entries can be 0x0-0x3F. This ID will be returned in the
  # motion report output when the button is released (de-asserted). When it is
  # pressed (asserted), the MSB bit is set so the ID value shows 0xA0 in the motion
  # report. See motion report output for further description.
42 # Device Config or button behavior (see bit description in Device_Config register)
  # these 2 bits set are the only valid bits to set. The "02" indicates report on release.
  # The "40" bit indicates repeated output as long as button pressed; if this byte was
  # "02" instead of "42", then only 1 output will be made on press, and a second
  # output on release of press.
02 # Touch Delay—the number of 6.6 ms frames used to "debounce" the button press
03 # Hold-off the number of 6.6 ms frames than need to pass after "release" before
  # another press event can be detected—adds to TouchDelay but only on "release"
00 # Group 0 (valid groups are values from 0 to 9; 0="$1^{st}$" group). Only button in 0.
00 # reserved byte
01 # Cell number—this is the equivalent cell number the button would occupy using
  # normal drive/sense mapping for the panel array (even if the button is physically
  # separate from the panel array)—see formula below for Equivalent Cell Number.
  # Note that "01" is in hexadecimal; For example, cell 16 would be shown as "10".
00 # reserved byte
Next button is the same except for different ID, group 1, and different cell number:
21 # ID="21" shown on release (see figure above); "A1" shown on press in output.
42 # Device_Config behavior
02 # Touch Delay of 2x6.7 ms
03 # Hold-off Delay of 3x6.7 ms
01 # Group 1 ($2^{nd}$ group; 3 buttons in group 1)
00 # reserved byte
02 # Cell number (equivalent) determined from drive/sense mapping formula
00 # reserved byte
Next button is the same except for different ID, with group 1, and different cell no.
22 # ID="22" shown on release (see figure above); "A2" shown on press in output.
42 # Device_Config behavior
02 # Touch Delay
03 # Hold-off
01 # Group 1 ($2^{nd}$ group)
00 # reserved byte
03 # Cell number (equivalent) determined from drive/sense mapping formula
00 # reserved byte
Next button is the same except for different ID, with group 1, and different cell no.
23 # ID="23" shown on release (see figure above); "A3" shown on press in output.
42 # Device_Config behavior
02 # Touch Delay
03 # Hold-off
01 # Group 1 ($2^{nd}$ group)
00 # reserved byte
04 # Cell number (equivalent) determined from drive/sense mapping formula
00 # reserved byte
Next button is the same except for different ID, with group 1, and different cell no.
24 # ID="24" shown on release (see figure above); "A4" shown on press in output.
42 # Device_Config behavior
02 # Touch Delay 03 # Hold-off
02 # Group 2 (3rd group) shares group 2 with slider below.
00 # reserved byte
05 # Cell number (equivalent) determined from drive/sense mapping formula
00 # reserved byte
The above 8 byte sets are repeated for each button or slider specified (up to 12 buttons plus up to 4 sliders maximum for this implementation), although the values of each of the bytes may vary for different buttons for individual characteristics desired or relationships to other buttons (i.e., Group number). If less than 12+4 sliders are to be specified, it is necessary to fill out the other unused 8 byte packets with dummy values as spacers to "pad out" the data when subsequent configuration data is to be specified (groups data and/or slider width and cell number details).
31 # ID of slider (see figure above)—we are specifying 1 slider with the 1 button
 # above. The 8 byte slider packets (if any to be specified) need to immediately
 # follow the last declared button packet (no padding or dummy bytes should
 # separate specified buttons from sliders). After all buttons and sliders are declared,
 # any remaining 8 bytes packets need to be filled out with dummy values.
 # See below for example. Note that this ID will have the high bit set on press
 # indication in the motion report output ("B1" will show as the ID in this case).
40 # Device Config or slider behavior (see bit description in Device_Config register).
 # here we are leaving only the repeat bit set for repeated output to the motion
 # report while pressing on the slider. The "release" bit is clear to indicate we do
 # do not want to see the "31" release output ID, only the "B1" press output events.
03 # Touch Delay for slider—3 frames of 6.6 ms delay to debounce slider presses
02 # Hold-off—2 frames of 6.6 ms delay must elapse before allowing re-assertion of
 # of a press on the same slider (even if in a different cell or location along slider).
02 # Group number (shares same group 2 with button ID "24" above)
00 # reserved byte
04 # Number of cells in slider (valid values of 02 to 0A—hexadecimal for ten).
 # Note that this byte is used differently for sliders than for buttons where it
 # designated the equivalent cell number. For sliders, the equivalent cell numbers
 # are specified below after the groups section. This was separated this way for
 # design flexibility and to keep the 8 byte configuration packet size consistent
 # between buttons and sliders.
00 # reserved byte
Following are detailed register descriptions of the Device n Block registers above:

| ID | Index: 0x0E, etc. |
|---|---|

Access: Write Only Default Value: 0x00

| Bit | 7 | 6 | 5 | 4 | 3 | 2 | 1 | 0 |
|---|---|---|---|---|---|---|---|---|
| Field | 0 | 0 | $ID_5$ | $ID_4$ | $ID_3$ | $ID_2$ | $ID_1$ | $ID_0$ |

Data Type: Bit Field
USAGE: This register indicates the Button ID. The full value $ID_{[5:0]}$ will be the one reported in the Motion Report. Note that bits 6 and 7 must be 0, and bit 5 must be set to 1 for any button or slider.

| Field Name | Description |
|---|---|
| $ID_5$ | Button ID<br>0 = Reserved.<br>1 = Button or Slider. |
| $ID_{[4:0]}$ | ID Number. |

| DEVICE_CONFIG | Index: 0x0F, etc. |
|---|---|

Access: Write Only Default Value: 0x00

| Bit | 7 | 6 | 5 | 4 | 3 | 2 | 1 | 0 |
|---|---|---|---|---|---|---|---|---|
| Field | Reserved | $BCFG_6$ | Reserved | Reserved | Reserved | Reserved | $BCFG_1$ | Reserved |

Data Type: Bit Field
USAGE: Configuration bits for Button or Slider.

| Field Name | Description |
|---|---|
| $BCFG_6$ | Repeat Enable<br>0 = Disable Repeat.<br>1 = Enable Repeat. Output this button as long as the Touch Strength is above T3. |
| $BCFG_1$ | Release Check. Reports with zero force and touch bit 0.<br>0 = Disable Release Check.<br>1 = Enable Release Check. |

| TOUCH_DELAY | Index: 0x10, etc. |
|---|---|

Access: Write Only Default Value: 0x00

| Bit | 7 | 6 | 5 | 4 | 3 | 2 | 1 | 0 |
|---|---|---|---|---|---|---|---|---|
| Field | | | | | Range: 0x00-0x7F | | | |

Data Type: Eight-bit number
USAGE: Touch Delay is the number of frames to wait before asserting a Button touch. It can also be thought of as the "debounce" period.

| HOLDOFF | Index: 0x11, etc. |
|---|---|

Access: Write Only Default Value: 0x00

| Bit | 7 | 6 | 5 | 4 | 3 | 2 | 1 | 0 |
|---|---|---|---|---|---|---|---|---|
| Field | | | | | Range: 0x00-0x7F | | | |

Data Type: Eight-bit number

-continued

USAGE: is the number of frames to wait after a Button is released before that button or any other button in its group can be detected.

| GROUP | Index: 0x12, etc. |
|---|---|

Access: Write Only Default Value: 0xFF
Bit    7    6    5    4    3    2    1    0
Field                    Range: 0x00-0xFF
Data Type: Eight-bit number
USAGE: This register assigns the Button to this numbered Group. 0xFF denotes
No Group.

| CELL_COUNT | Index: 0x14, etc. |
|---|---|

Access: Write Only Default Value: 0x00
Bit    7    6    5    4    3    2    1    0
Field                    Range: 0x00-0x7F
Data Type: Eight-bit number
USAGE: If a Button, CELL_COUNT = cell number within MAX_CELLS; if a Slider, CELL_COUNT = positions (number of cells in the slider).

Referring back to the table:
1) General Settings Block (14 bytes, Indexes 00-0D)
2) Device n Block (Indexes 0E-8D)
3)—Padding Out Unused Bytes (of Device n Block)
4) Group Devices Block (10 bytes, Indexes 8E-97)
5) Group n Block (200 bytes, Indexes 98-15F)
6)—Padding Out Unused Bytes (of Group n Block)
7) Slider n Block (88 bytes, Indexes 160-1B7)
Pad Out Unused Bytes:
Next we pad out the remaining 8 byte packets (up to 16 total of Device n Block) with ## dummy values. The easiest way to do this is to start with a template of the 16 packets ## of dummy values, counting upward in hexadecimal blocks such as:
00 # repeat this line 8 times (a block of 8 lines—"00" is tracking this block)
11 # repeat this line 8 times ("11" is used for tracking this block)
22 # repeat this line 8 times ("22" is used for tracking this block)
33 # repeat this line 8 times
44 # repeat this line 8 times
55 # repeat this line 8 times
66 # repeat this line 8 times
77 # repeat this line 8 times
88 # repeat this line 8 times
99 # repeat this line 8 times
AA # repeat this line 8 times
BB # repeat this line 8 times
CC # repeat this line 8 times
DD # repeat this line 8 times
EE # repeat this line 8 times
FF # repeat this line 8 times
Next fill in each of the 8 line blocks above sequentially with the specified buttons and sliders in the design as we already did. Since in this design, we used 5 buttons+1 slider, we would have "consumed" the lines in blocks 00-55 with our configurations described above. What remains are the "padded out" blocks for 66-FF that serve as our placeholders.

Referring back to the table:
1) General Settings Block (14 bytes, Indexes 00-0D)
2) Device n Block (Indexes 0E-8D)
3)—Padding Out Unused Bytes (of Device n Block)
4) Group Devices Block (10 bytes, Indexes 8E-97)
5) Group n Block (200 bytes, Indexes 98-15F)
8)—Padding Out Unused Bytes (of Group n Block)
9) Slider n Block (88 bytes, Indexes 160-1B7)
Group Devices Block
Now we are ready to fill in the number of buttons & slider for each group (up to 10 ## groups). Group Devices is simply the count of number of buttons and/or sliders in
that Group.
01 # Number of buttons & sliders in Group 0 (1 button—see figure above)
03 # Number of buttons & sliders in Group 1 (3 buttons—see figure above)
02 # Number of buttons & sliders in Group 2 (1 button plus 1 slider—see figure)
00 # Number of buttons & sliders in Group 3
00 # Number of buttons & sliders in Group 4
00 # Number of buttons & sliders in Group 5
00 # Number of buttons & sliders in Group 6
00 # Number of buttons & sliders in Group 7
00 # Number of buttons & sliders in Group 8
00 # Number of buttons & sliders in Group 9
00 # Number of buttons & sliders in Group 10

| GROUP_DEVICES | Indexes: 0x8E-97 |
|---|---|

Access: Write Only Default Value: 0x00
Bit    7    6    5    4    3    2    1    0
Field                    Range: 0x00-0x0A
Data Type: Eight-bit number
USAGE: The number Devices within each Group.

Referring back to the table:
1) General Settings Block (14 bytes, Indexes 00-0D)
2) Device n Block (128 bytes, Indexes 0E-8D)
3)—Padding Out Unused Bytes (of Device n Block)
4) Group Devices Block (10 bytes, Indexes 8E-97)
5) Group n Block (200 bytes, Indexes 98-15F)
5)—Padding Out Unused Bytes (of Group n Block)
6) Slider n Block (88 bytes, Indexes 160-1B7)
Group n Blocks:
Now we are ready to fill in the group configurations:

Group n Block

There are up to 10 groups of 20 bytes (14 in hexadecimal) labeled as "Group n" where n is a value from 0 to 9 for each of the up to 10 groups. See table labeled "Group n". When less than 10 groups (or even no groups) are specified, the remaining groups can be left unspecified or can be set to "00". The $9^{th}$ byte in each Group block is a bit-field labeled "Group Config" described in the "Group Config" description below.

| Index | Description |
|---|---|
| 0x98 + n × 20 | T1 Lo ("release" threshold lower byte) |
| 0x99 + n × 20 | T1 Hi ("release" threshold upper byte) |
| 0x9A + n × 20 | T2 Lo ("press" threshold lower byte) |
| 0x9B + n × 20 | T2 Hi ("press" threshold upper byte) |
| 0x9C + n × 20 | Edge Min Lo (starting point of panel edge exclusion - lo byte) |
| 0x9D + n × 20 | Edge Min Hi (starting point of exclusion in pixels - hi byte) |

-continued

| Index | Description |
|---|---|
| 0x9E + n × 20 | Edge Max Lo (ending point of panel edge exclusion - lo byte) |
| 0x9F + n × 20 | Edge Max Hi (ending point of exclusion in pixels - hi byte) |
| 0xA0 + n × 20 | Group Config (bit field options for this group) |
| 0xA1 + n × 20 | Group Positions (number of group neighbors to this group) |
| 0xA2 + n × 20 | Next To 0 (first neighbor group to this group) |
| 0xA3 + n × 20 | Next To 1 (second neighbor group to this group) |
| 0xA4 + n × 20 | Next To 2 (etc.) |
| 0xA5 + n × 20 | Next To 3 |
| 0xA6 + n × 20 | Next To 4 |
| 0xA7 + n × 20 | Next To 5 |
| 0xA8 + n × 20 | Next To 6 |
| 0xA9 + n × 20 | Next To 7 |
| 0xAA + n × 20 | Next To 8 |
| 0xAB + n × 20 | Next To 9 |

Group 0:
D4 # Low byte of Threshold 1 (release threshold: 0x3D4 is 980 in decimal)
03 # High byte of Threshold 1 (release threshold—980 units of signal strength)
92 # Low byte of Threshold 2 (press threshold: 0x29 is 2345 in decimal)
09 # High byte of Threshold 2 (press threshold—2345 units of signal strength)
00 # Low byte of Min. Screen Edge dimension (only valid if Config bit 1 set below)
00 # High byte of Min. Screen Edge dimension (only valid if Config bit 1 set below)
00 # Low byte of Max. Screen Edge dimension (only valid if Config bit 1 set below)
00 # High byte of Max. Screen Edge dimension (only valid if Config bit 1 set below)
00 # Configuration bits for group: bit 1=edge check enabled; bit 2:3=edge to check:
    Bits 3:2=>00=Min. Column; 01=Max. Col; 10=Min. Row; 11=Max Row.
    Bit 4: 1=use default thresholds; 0=use specified thresholds (Thresh1, Thresh2)
01 # Neighbors—count of neighboring groups to this group
01 #$1^{st}$ neighbor group number (group 1)
0F #2nd neighbor group number (can use "0F" for unused groups)
0F #3rd neighbor group number
0F #4th neighbor group number
0F #5th neighbor group number
0F #$6^{th}$ neighbor group number
0F #$7^{th}$ neighbor group number
0F #$8^{th}$ neighbor group number
0F #$9^{th}$ neighbor group number
0F #$10^{th}$ neighbor group number
Group 1:
D4 # Low byte of Threshold 1 (release threshold)
03 # High byte of Threshold 1 (release threshold)
92 # Low byte of Threshold 2 (press threshold)
09 # High byte of Threshold 2 (press threshold)
83 # Low byte of Min. Screen Edge dimension of concern (83 hex=131 decimal)
00 # High byte of Min. Screen Edge dimension of concern
23 # Low byte of Max. Screen Edge dimension of concern (0123 hex=291 decimal)
01 # High byte of Max. Screen Edge dimension of concern (see above: "01" of 0123)
06 # Configuration bits for group: bit 1=edge check enabled; bit 2:3=edge to check:
    Bits 3:2=>00=Min. Column; 01=Max. Col; 10=Min. Row; 11=Max Row.
    Bit 4: 1=use default thresholds; 0=use specified thresholds (Thresh1, Thresh2)
Here "06" specifies edge check enabled and minimum Row to be checked
02 # Neighbors—count of neighboring groups to this group that we care about
00 #$1^{st}$ neighbor group number (group 0)
02 #2nd neighbor group number (group 2)
0F #3rd neighbor group number (can use "0F" for unused groups)
0F #4th neighbor group number
0F #5th neighbor group number
0F #$6^{th}$ neighbor group number
0F #$7^{th}$ neighbor group number
0F #$8^{th}$ neighbor group number
0F #$9^{th}$ neighbor group number
0F #$10^{th}$ neighbor group number
group 2:
00 # Low byte of Threshold 1 (release threshold)
00 # High byte of Threshold 1 (release threshold)
00 # Low byte of Threshold 2 (press threshold)
00 # High byte of Threshold 2 (press threshold)
00 # Low byte of Min. Screen Edge dimension of concern (83 hex=131 decimal)
00 # High byte of Min. Screen Edge dimension of concern
00 # Low byte of Max. Screen Edge dimension of concern (0123 hex=291 decimal)
00 # High byte of Max. Screen Edge dimension of concern (see above: "01" of 0123)
08 # Configuration bits for group: bit 1=edge check enabled; bit 2:3=edge to check:
    Bits 3:2=>00=Min. Column; 01=Max. Col; 10=Min. Row; 11=Max Row.
    Bit 4: 1=use default thresholds; 0=use specified thresholds (Thresh1, Thresh2)
Here "08" specifies to use touch panel threshold defaults for this group
01 # Neighbors—count of neighboring groups to this group
01 #$1^{st}$ neighbor group number (group 1)
0F #2nd neighbor group number (can use "0F" for unused groups)
0F #3rd neighbor group number
0F #4th neighbor group number
0F #5th neighbor group number
0F #$6^{th}$ neighbor group number
0F #$7^{th}$ neighbor group number
0F #$8^{th}$ neighbor group number
0F #$9^{th}$ neighbor group number
0F #$10^{th}$ neighbor group number The detailed descriptions of the registers above are as follows:

| T1_LO | | | | Index: 0x98, etc. | | | |
|---|---|---|---|---|---|---|---|
| Access: Write Only Default Value: 0x71 | | | | | | | |
| Bit Field | 7 | 6 | 5 | 4 | 3 | 2 | 1 0 |
| Data Type: Lower eight bits [7:0] of a sixteen-bit number; see also 0x99. | | | | | | | |

| T1_HI | | | | Index: 0x99, etc. | | | |
|---|---|---|---|---|---|---|---|
| Access: Write Only Default Value: 0x02 | | | | | | | |
| Bit Field | 7 | 6 | 5 | 4 | 3 | 2 | 1 0 |
| Data Type: Upper eight bits [15:8] of a sixteen-bit number | | | | | | | |

-continued

USAGE: This is the Touch Strength below which to release a Button Touch.

T2_LO                              Index: 0x9A, etc.

Access: Write Only Default Value: 0xD6
Bit         7    6    5    4    3    2    1    0
Field
Data Type: Lower eight bits [7:0] of a sixteen-bit number; see also 0x9B.

T2_HI                              Index: 0x9B, etc.

Access: Write Only Default Value: 0x06

EDGE_MAX_LO                        Index: 0x9E, etc.

Access: Write Only Default Value: 0x00
Bit         7    6    5    4    3    2    1    0
Field
Data Type: Lower eight bits [7:0] of a sixteen-bit number; see also 0x9F.

EDGE_MAX_HI                        Index: 0x9F, etc.

Access: Write Only Default Value: 0x00
Bit         7    6    5    4    3    2    1    0
Field
Data Type: Upper eight bits [15:8] of a sixteen-bit number
USAGE: Edge Max is the value used to detect if a navigation touch occurred near (in "proximity" of) our group. This range endpoint may be along any of the four edges of the navigation area depending on the value of GROUP_CONFIG (Index 0x08) bits Edge Check Select (GCFG$_{[3:2]}$).

GROUP_CONFIG                       Index: 0xA0, etc.

Access: Write Only Default Value: 0x00
Bit       7         6         5         4         3       2       1       0
Field  Reserved  Reserved  Reserved  Reserved  GCFG$_3$  GCFG$_2$  GCFG$_1$  Reserved
Data Type: Bit Field
USAGE: Configuration bits for Button or Slider Groups.

| Field Name | Description |
| --- | --- |
| GCFG$_{[3:2]}$ | Edge "Proximity" Check Select<br>00 = Check ROW_MAX edge.<br>01 = Check ROW_MIN edge.<br>10 = Check COL_MAX edge.<br>11 = Check COL_MIN edge. |
| GCFG$_1$ | Edge "Proximity" Check Enable<br>0 = Disable Edge Min and Edge Max check.<br>1 = Enable Edge Min and Edge Max check. |

-continued

Bit         7    6    5    4    3    2    1    0
Field
Data Type: Upper eight bits [15:8] of a sixteen-bit number
USAGE: This is the Touch Strength to register a Button Touch.

EDGE_MIN_LO                        Index: 0x9C, etc.

Access: Write Only Default Value: 0x00
Bit         7    6    5    4    3    2    1    0
Field
Data Type: Lower eight bits [7:0] of a sixteen-bit number; see also 0x9D.

EDGE_MIN_HI                        Index: 0x9D, etc.

Access: Write Only Default Value: 0x00
Bit         7    6    5    4    3    2    1    0
Field
Data Type: Upper eight bits [15:8] of a sixteen-bit number
USAGE: Edge Min is the value used to detect if a Navigation Touch occurred near (in "proximity" of) our group. This range endpoint may be along any of the four edges of the Navigation area depending on the value of GROUP_CONFIG (Index 0x08) bits Edge Check Select (GCFG$_{[3:2]}$).

GROUP_POSITIONS                    Index: 0xA1, etc.

Access: Write Only Default Value: 0x00
Bit         7    6    5    4    3    2    1    0
Field                        Range: 0x00-0x7F
Data Type: Eight-bit number
USAGE: Group Positions is the number of button/slider groups that are next to this one.

NEXT_TO_*                          Index: 0xA2-AB, etc.

Access: Write Only Default Value: 0x00
Bit         7    6    5    4    3    2    1    0
Field                        Range: 0x00-0x7F
Data Type: Eight-bit number
USAGE: This a list of the groups that are Next To this one. If this group of Buttons/Sliders has a touch, then the groups Next To this one can be disabled or inhibited from reporting a touch.

Referring back to the table:
  1) General Settings Block (14 bytes, Indexes 00-0D)
  2) Device n Block (128 bytes, Indexes 0E-8D)
  3)—Padding Out Unused Bytes (of Device n Block)
  4) Group Devices Block (10 bytes, Indexes 8E-97)
  5) Group n Block (200 bytes, Indexes 98-15F)
  6)—Padding Out Unused Bytes (of Group n Block)
  7) Slider n Block (88 bytes, Indexes 160-1B7)
Pad Out Unused Bytes/Blocks:
Next we pad out the remaining 20 byte packets with dummy values.

The easiest way to do this is to start with a template of the 10 packets of dummy values, counting upward from 0-9 in 20 byte blocks such as:
00 # repeat this line 20 times (a block of 20 lines)
11 # repeat this line 20 times
22 # repeat this line 20 times
33 # repeat this line 20 times
44 # repeat this line 20 times
55 # repeat this line 20 times
66 # repeat this line 20 times
77 # repeat this line 20 times
88 # repeat this line 20 times
99 # repeat this line 20 times
Next fill in each of the 20 line blocks above sequentially with the specified groups as above. Since in this design we used 3 groups, we would have "consumed" the lines in blocks 00-22 with our groups configuration described above. What remains are the "padded out" blocks for 33-99 that serve as placeholders.
Referring back to the table:
 1) General Settings Block (14 bytes, Indexes 00-0D)
 2) Device n Block (Indexes 0E-8D)
 3)—Padding Out Unused Bytes (of Device n Block)
 4) Group Devices Block (160 bytes, Indexes 8E-97)
 5) Group n Block (200 bytes, Indexes 98-15F)
 6)—Padding Out Unused Bytes (of Group n Block)
Slider n Block (88 bytes, Indexes 160-1B7)
Slider n Block:
Now we are ready to fill in the final slider details:

Slider n Block

There are 4 blocks of 22 bytes (16 in hexadecimal) labeled as "Slider n" where n is a value from 0 to 3 for each of the up to 4 sliders possible. See table labeled "Slider n". Each of the slider n cells are entered in this section. For sliders that use less than 10 cells, the remaining cells need not be filled in or can be set to "00".

| Index | Description |
|---|---|
| 0x160 + n × 22 | Record Width Lo (pixel width of slider cell - lo byte) |
| 0x161 + n × 22 | Record Width Hi (pixel width of slider cell - hi byte) |
| 0x162 + n × 22 | Cell 0 (first cell of slider) |
| 0x163 + n × 22 | Padding (leave as 0x00) |
| 0x163 + n × 22 | Cell 1 (second cell of slider) |
| 0x165 + n × 22 | Padding (leave as 0x00) |
| 0x166 + n × 22 | Cell 2 (third cell of slider) |
| 0x167 + n × 22 | Padding (leave as 0x00) |
| 0x168 + n × 22 | Cell 3 (etc.) |
| 0x169 + n × 22 | Padding (leave as 0x00) |
| 0x16A + n × 22 | Cell 4 |
| 0x16B + n × 22 | Padding (leave as 0x00) |
| 0x16C + n × 22 | Cell 5 |
| 0x16D + n × 22 | Padding (leave as 0x00) |
| 0x16E + n × 22 | Cell 6 |
| 0x16F + n × 22 | Padding (leave as 0x00) |
| 0x170 + n × 22 | Cell 7 |
| 0x171 + n × 22 | Padding (leave as 0x00) |
| 0x172 + n × 22 | Cell 8 |
| 0x173 + n × 22 | Padding (leave as 0x00) |
| 0x174 + n × 22 | Cell 9 |
| 0x175 + n × 22 | Padding (leave as 0x00) |

Note: Each padding byte must be specified as "00". If only 1 slider is specified,
dummy values for other sliders need not be filled in.
In addition, if that 1 slider uses less than the maximum 10 cells allowed,
dummy values for the other cells need not be filled in.
The amount of data downloaded will stop when the number of bytes processed
matches the count listed in the header block. A termination byte (0xEE)
(see below) is the final byte included in the count to validate there was no
mismatch.
80 # Slider Record Width_LO—the low byte of a slider segment width in pixels
00 # Slider Record Width_HI—the high byte of slider segment (a.k.a, SRec_Width)
06 # First of 4 sliders cell numbers expected: Equivalent cell 6 in figure above
00 # Padding byte (always 00)
07 #$2^{nd}$ of 4 slider cell numbers expected: Cell 7 equivalent in figure above
00 # Padding byte (always 00)
08 #$3^{rd}$ of 4 slider cell numbers expected: Cell 8 equivalent in figure above
00 # Padding byte (always 00)
09 # last of 4 slider cell numbers expected: Cell 9 equivalent in figure above
00 # Padding byte (always 00)
EE # TERMINATION BYTE (always "EE" and always required)

The detailed description of the slider registers above are as follows:

| RECORD_WIDTH_LO | | | | Index: 0x160, etc. | | | |
|---|---|---|---|---|---|---|---|
| Access: Write Only Default Value: 0xEE | | | | | | | |
| Bit Field | 7 | 6 | 5 | 4 | 3 | 2 | 1 | 0 |
| Data Type: Also called SRec_Width_Lo: Lower eight bits [7:0] of a sixteen-bit number; see also Record_Width_Hi. | | | | | | | |

| RECORD_WIDTH_HI | | | | Index: 0x161, etc. | | | |
|---|---|---|---|---|---|---|---|
| Access: Write Only Default Value: 0x02 | | | | | | | |
| Bit Field | 7 | 6 | 5 | 4 | 3 | 2 | 1 | 0 |
| Data Type: Upper eight bits [15:8] of a sixteen-bit number | | | | | | | |
| USAGE: Also called SRec_Width_Hi: Record Width is the number of pixel counts interpolated between two adjacent Cells in a Slider. | | | | | | | |

| CELL_* | | | | Index: 0x162, etc. | | | |
|---|---|---|---|---|---|---|---|
| Access: Write Only Default Value: 0x00 | | | | | | | |
| Bit Field | 7 | 6 | 5 | 4 | 3 | 2 | 1 | 0 |
| | | | | Range: 0x00-0xEF | | | |
| Data Type: Eight-bit number | | | | | | | |
| USAGE: CELL_* assigns the list of cells to the slider. The cell value is the index of one of the cells. The total number of cells in the slider is assigned in DEVICE n, CELL_COUNT (Index 0x14 + n * 8). | | | | | | | |

Equivalent Cell Number

To determine equivalent cell number, identify from the layout which sense and drive line cross at the button "cell" or slider segment cell of interest. For example, use sense lines numbered from 0 to 11 (as marked on the AMRI-5200 pin diagram) and use drive lines 0 to 19 (as marked on the AMRI-5200 pin diagram) and determine from the schematic connec tion to the button "cell" which ones are used. Then the following formula is used:

Equivalent Cell Number=SenseY*20+DriveX (where SenseY valid values are 0 to 11, and DriveX valid values are 0 to 19).

For example, if sense line 11 and drive line 8 cross at a button cell, the equivalent cell number is:

11*20+8=220+8=228

Cell 228 converted to hex ("E4") would be entered into Cell Number in the BUTTON BLOCK for this example button.

Figure 9:
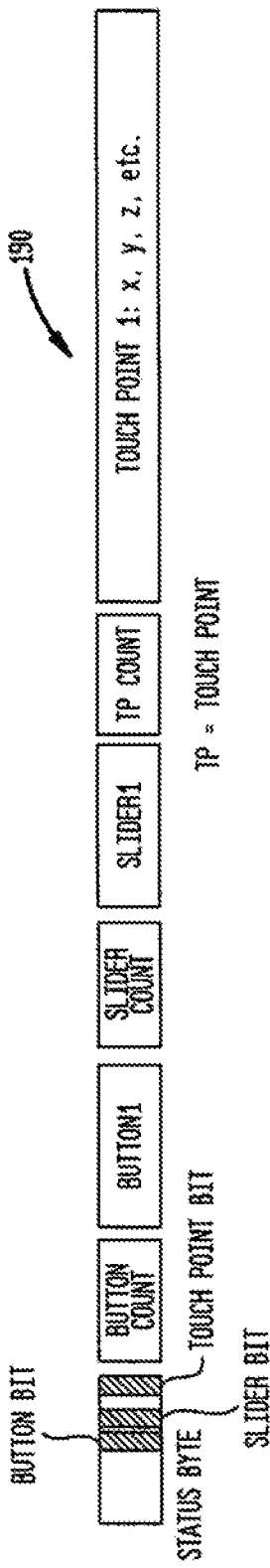
FIG. 9 shows one embodiment of motion report data.

Referring now to FIG. 9, there are shown example motion report data 190 according to one embodiment, where bytes are read from left to right serially from the same register location. Button and slider events trigger an interrupt from the AMRI-5200 controller 100 to the host processor 120. The same interrupt is generated with touch point events or other types of events. The host processor 120 responds to the interrupt by reading the first byte of the motion report (the status byte) from the motion data register. Bits in the status byte tell the host processor 120 which type of event(s) occurred and are contained in the motion report. The host may choose to either read all or part (or none) of the motion report to obtain further details regarding the event(s) of interest to the host processor 120. The motion report is read out serially as a stream of bytes by repeatedly reading from the motion data register (each read triggers the next byte of data to be automatically placed in the same motion data for subsequent read access). Button and slider events are embedded in the motion report when the bit corresponding thereto is set true (high) in the status byte. Each type of data (buttons, sliders, touch points, etc.) is preceded by a count of the number of "packets" of that type of data. In one embodiment, button packets contain 3 bytes each: ID and a 2 byte "Z" or signal strength value, and slider packets contain 5 bytes each: ID, a 2 byte value for position, and a 2 byte value for "Z" or signal strength. The position value is in pixels scaled using the customers downloaded "SRec_Width" cell dimension parameter times the number of sliders cells.

Figure 10:
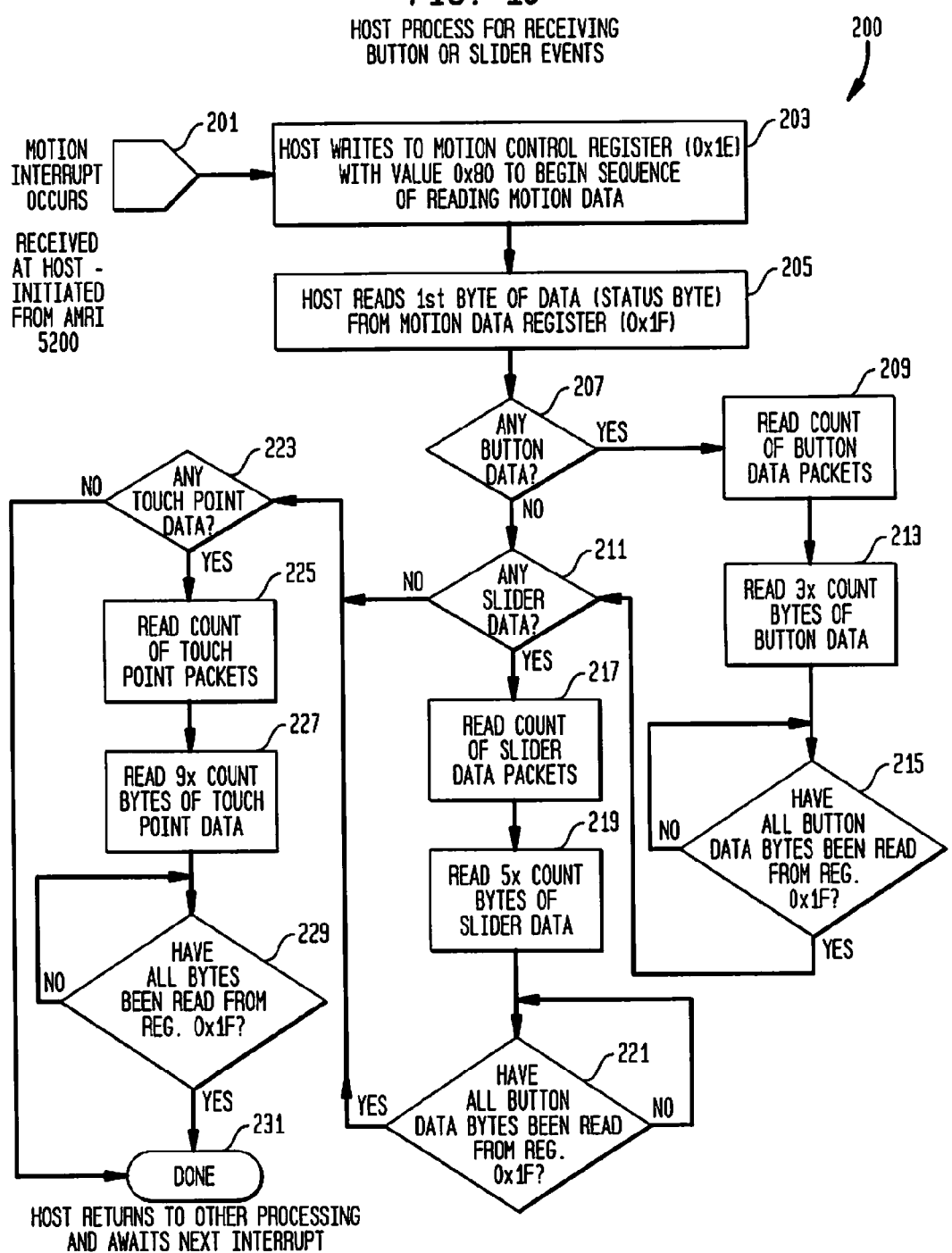
FIG. 10 shows one embodiment of a method according to which a host processor receives button or slider events.

FIG. 10 shows one embodiment of a method 200 according to which the host processor 120 receives button or slider events, as reflected by steps 201 through 231 thereof.

Figure 11:
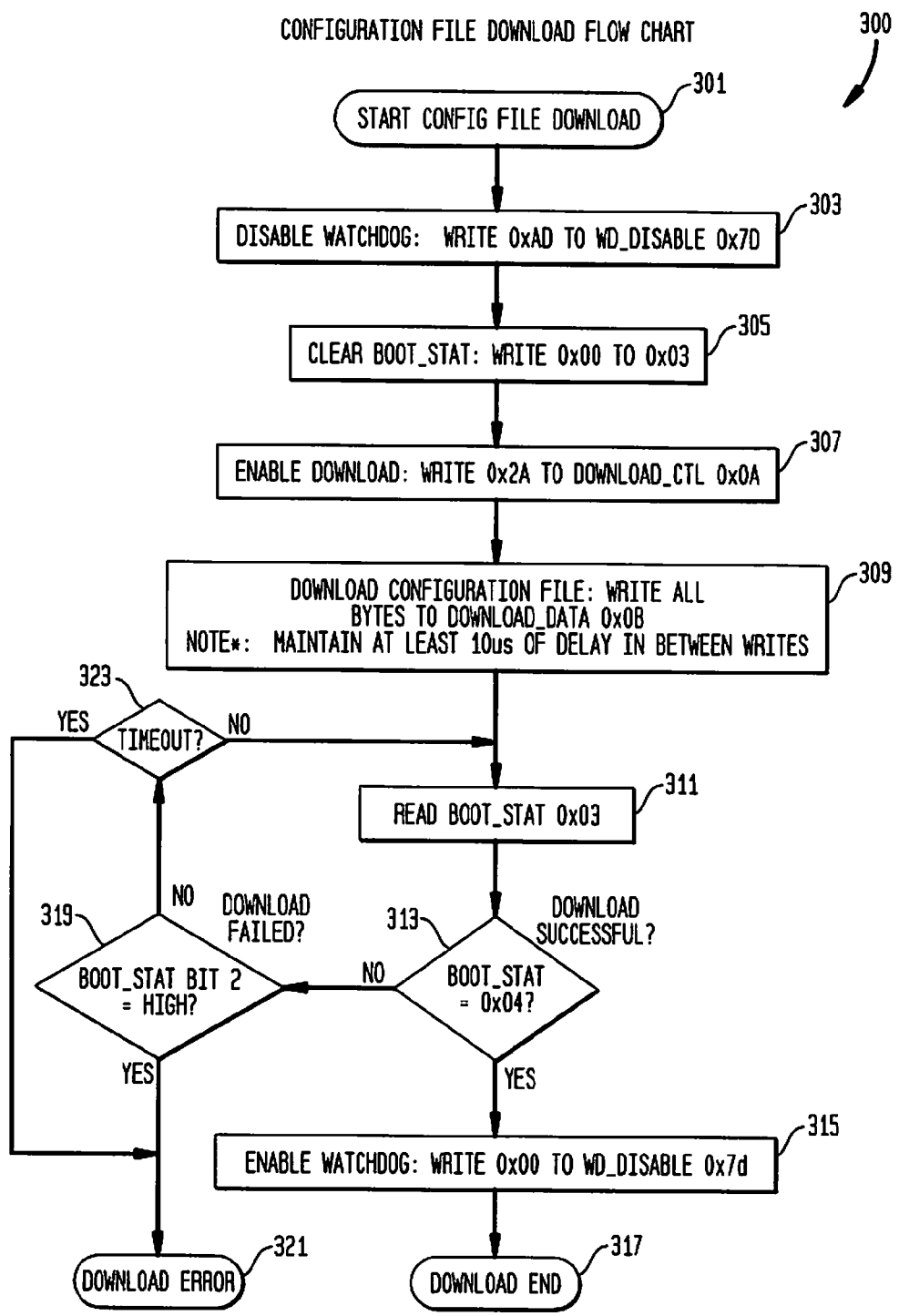
FIG. 11 shows one embodiment of a method according to which a host processor downloads data configuration files to a touchscreen controller.

FIG. 11 shows one embodiment of a method 300 according to which the host processor 120 downloads data configuration files to touchscreen controller 100 (and in particular an AMRI-5200 touchscreen controller). In the configuration file download procedure corresponding to steps 301 through 323 of FIG. 10, the AMRI-5200 controller requires a data configuration file download to configure buttons and sliders. The configuration file must be loaded through SPI or TWI bus after power on, using the register addresses indicated below. Note, register 0x3 (BOOT_STAT) bit 0 must be set prior to this procedure, indicating AMRI-5200 power up complete.

1) Write 0xAD to register 0x7D which disables the watchdog
2) Write 0x00 to register 0x3 to clear BOOT_STAT. This ensures correct reads in step 5.
3) Write 0x2A to register 0x0A to enable download routine
4) Write all the bytes button_slider configuration file to register 0x0B. Maintain a minimum delay time of 10 us or above in between bytes written to this register. This is to allow the AMRI-5200 to process the previous written byte.
5) Read register 0x3 until bit 6 (0x0) is set is set (but start over on timeout/error)
6) Write 0x00 to register 0x7D which enables the watchdog FIGS. 12 through 17 are flowcharts corresponding to different processes and methods carried out by an AMRI-5200 controller that has received programming instructions and data from a host processor to permit the use of buttons, sliders and groups as described above. The flowcharts of FIGS. 12 through 17 define a firmware state machine that runs on a navigation touch controller integrated circuit (i.e., an AMRI-5200 touchscreen controller). The touchscreen controller contains an integrated on-chip processor to process firmware algorithms, and a customized analog and digital front end interface to manage, sense and locate touches on an array of touch cells integrated into a connected touch panel. The flowcharts of FIGS. 12 through 17 show various embodiments of algorithms that process button sensing and control in a flexible manner to meet a designer's needs for customizing and grouping buttons and/or sliders in close proximity to one another and/or with a navigational touch area. Touches on the navigational touch area are sensed by other firmware and reported to an off-chip host processor through a serial bus in a reporting format called the "motion report". Such firmware has already executed before the buttons and slider firmware shown in these flowcharts has run. Thus, there is already information available in firmware data structures identifying touches on the navigational touch area, including the X/Y position of the touches on the 2D array. That information can be utilized by the button/slider firmware when there is a need to exclude certain touches on the edge of the touch panel in close proximity to a button or slider. If needed, the button/slider firmware can then set an "inhibit bit" for any of these touch points that would exclude them from being included in the motion report.

The flowcharts of FIGS. 12 through 17 assume that other firmware has already downloaded the table of button/slider configuration instructions and data into RAM. The processor embedded in the touchscreen controller operates on and parses the instructions and data in that table when processing buttons and sliders functionality to match the designer's specific requirements. In addition, the firmware utilizes the capacitive sensing hardware interface built into the controller to assist in sensing the buttons and sliders.

The download table has been designed in a proprietary format to exactly match the organization of the internal data structures in RAM memory expected by the firmware. This allows the firmware to parse the downloaded instructions and data when executing the flowcharts shown in FIGS. 12 through 17. In this context, the downloaded instructions are in the form of bit-fields and control bytes that the firmware parses to drive decision points in such flowcharts.

In addition, the format may be scalable to the complexity of the design. This is convenient because it allows the code to sequentially step through only the valid buttons, sliders and group members identified by the designer, rather than the entire table of all configurable possibilities. This scalable download format has several significant benefits:

1) The scalable download format allows the firmware to operate efficiently for a variety of button/slider arrangements that the designer might choose;
2) The scalable download format permits the firmware to operate more efficiently in the event the host processor will only need a partial set of the full functionality available, since the firmware will only need to step through a subset of the full table.
3) With the host processor downloading a reduced set when fewer buttons or sliders are needed, the host processor spends less time in the download process which is utilizing a speed limited serial bus (SPI or TWI).

4) The download table can later be easily copied to the FLASH section of the touchscreen controller by other firmware for permanent storage and easy retrieval after a power cycle, so a one time download process is all that is required (perhaps performed at the factory to avoid any need to download at the customer's site).
5) The download format saves RAM space in the controller, where RAM space is very limited to keep controller cost low, because it is in a compact format using a minimum of bytes.

Process Buttons/Sliders Flowchart

Figure 12:
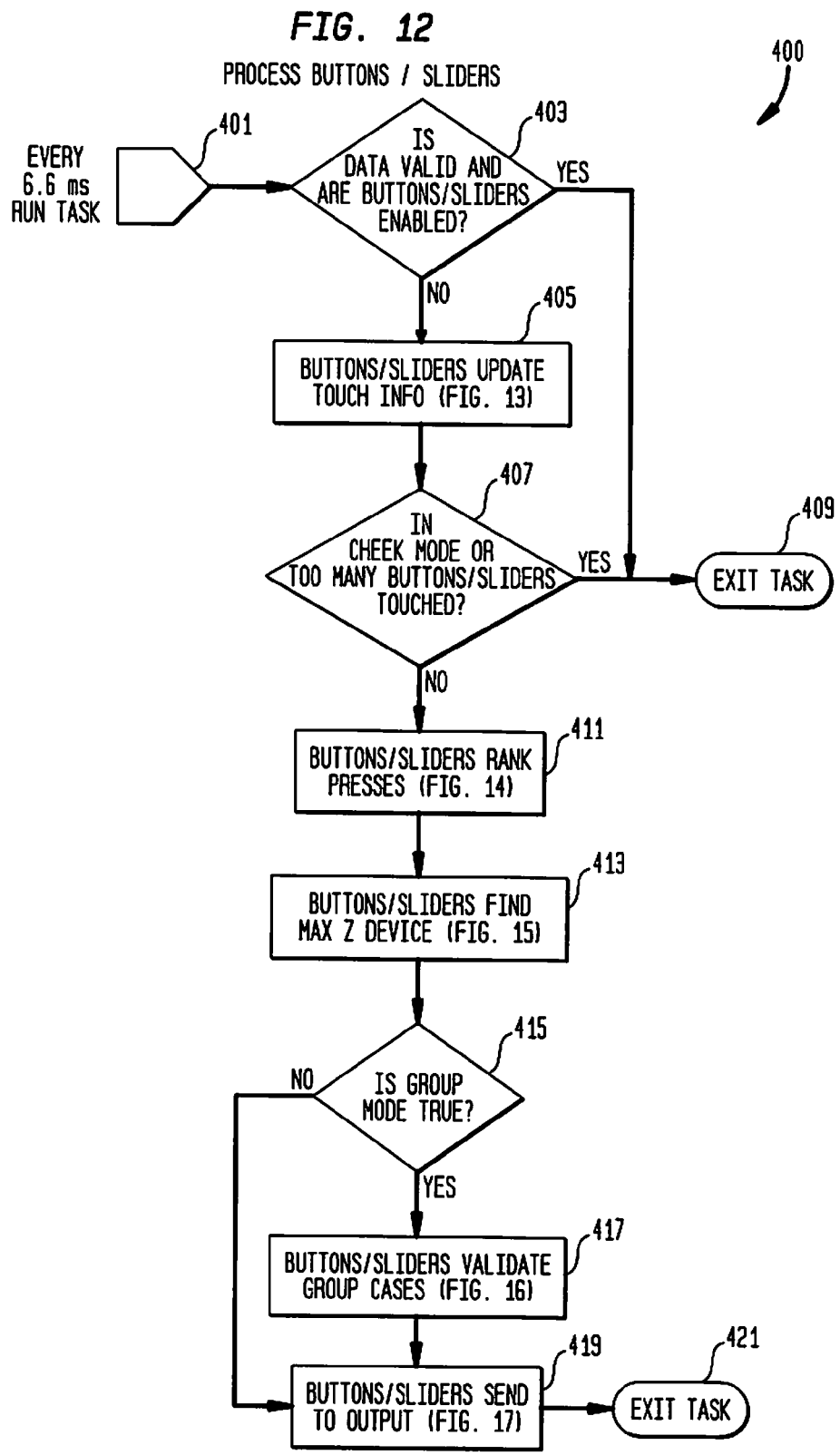

Referring now to FIG. 12, there is shown one embodiment of a method 400 corresponding to a Top Level Dispatcher, and comprising steps 410 through 421. If a data signature is valid and buttons/sliders have been enabled, then the following tasks are performed:
1) Update Touch Info (step 405)
2) Rank Presses (step 411)
3) Find Max Z Device (step 413)
4) Validate Group Cases (step 417)
5) Send Valid Events to Output (step 419)

Buttons/Sliders Update Touch Information Flowchart

Referring now to FIG. 13, there is shown one embodiment of a method 500 corresponding to a button/slider update touch information process comprising steps 501 through 523. Method 500 cycles through each valid button and slider to check the following:
1) If Button Control changed, reset all touch state info and exit all tasks (step 503)
2) Update "Z" values and position values (if sliders) and process them through a 3 state median filter (step 505)
3) If Z value is below threshold and age of press is less than Touch Delay, clear touch state information for this button or slider (steps 507 and 509)
4) If slider (step 513), calculate interpolated position along cells in the slider using downloaded cell width information (Srec_Width) (step 515)

Buttons/Sliders Rank Presses

Referring now to FIG. 14, there is shown one embodiment of a method 600 corresponding to button/slider rank presses comprising steps 601 through 641. Method 600 cycles through all valid buttons and sliders and carries out the following tasks:
1) Determine if using group thresholds and criteria (step 605), or default thresholds and criteria (step 641)
2) Compare "Z" values (signal strength) versus thresholds to determine if release bit or press bit should be set (steps 609, 639, 611 and 613)
3) Mark for output or not or if best candidate in group (steps 625 and 619)
4) If best candidate, set inhibit flags for other groups (step 621)
5) If already output, only output again if repeat bit set (step 623)

Buttons/Sliders Find Max Z Device

Referring now to FIG. 15, there is shown one embodiment of a method 700 corresponding to button/slider find max Z device processes comprising steps 701 through 737. For each group, method 700:
1) Identifies the best candidate (step 729), and marks its "to Output" bit (step 735)
2) Keeps track of whether an ID has already been sent to the output or needs to be sent again (repeat bit) or if released and sent to Output as a release report (step 733)
3) Allows "free agent" non-group buttons and sliders to always report press or release if appropriate when at least some groups are valid Button/Slider Validate Group Cases Referring now to FIG. 16, there is shown one embodiment of a method 800 corresponding to button/slider validate group cases comprising steps 801 through 837. For each group in method 800, if there is a touch panel edge check enabled, touch point reported X,Y positions are compared versus downloaded min and max screen edge parameters and groups are inhibited if parameters are in range. For each group, method 800 cycles through all members of the group. If all the members have been "released" (no touches), then that group's inhibit flag is cleared.

Buttons/Sliders Send to Output

Referring now to FIG. 17, there is shown one embodiment of a method 900 corresponding to buttons/sliders sent to output processes comprising steps 901 through 923. For each button or slider, method 900 checks its "to Output" bit and if true, copies the button ID and Z value, or if a slider copies slider ID, Z value, and sends the value to motion report output. Method 900 also resets age and press bit status. If a "release" is being output, the release bit for individual members or the group is cleared. All buttons (if present) are always first in motion report output before sliders due to the required ordering of the download data format.

As discussed above, various aspects of the embodiments disclosed herein are employed in the Avago Technologies® AMRI-5200 controller.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A method of operating a capacitive touchscreen system comprising a first plurality of electrically conductive drive electrodes arranged in rows or columns, a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a touchscreen controller operably connected to the first plurality of drive electrodes and the second plurality of sense electrodes, the touchscreen controller being operably connected to a host processor, the method comprising:

downloading computer-readable button group programming instructions and data from the host processor to a first portion of a memory of the touchscreen controller, the computer-readable button group programming instructions and data comprising steps for sensing and arbitrating among touches occurring on and within a first plurality of buttons, the first plurality of buttons being arranged in a first group on the touchscreen, the first group being located within a first portion of the touchscreen, capacitive sensing of touches occurring on and within at least second portions of the touchscreen that are located outside the first portion of the touchscreen being controlled by firmware instructions and data loaded into a second portion of the memory of the touchscreen controller, wherein the first plurality of buttons are exclusive to one another, when one of the first plurality of buttons is pressed, the rest of the first plurality of buttons are disabled.

2. The method of claim 1, further comprising concatenating the first plurality of buttons to form a first slider located in the first portion of the touchscreen.

3. The method of claim 2, further comprising implementing the first slider by providing computer-readable button group programming instructions and data corresponding to a Flying V algorithm.

4. The method of claim 1, further comprising configuring the computer-readable button group programming instructions and data to sense and arbitrate among touches occurring on or within the first group and the first group is located along a first edge of the touchscreen.

5. The method of claim 1, further comprising configuring the computer-readable button group programming instructions and data to sense and arbitrate among touches occurring on and within a second plurality of buttons, the second plurality of buttons being arranged in a second group located within the first portion of the touchscreen.

6. The method of claim 5, further comprising concatenating the second plurality of buttons to form a second slider located in the first portion of the touchscreen.

7. The method of claim 6, further comprising implementing the second slider by providing computer-readable button group programming instructions and data corresponding to a Flying V algorithm.

8. The method of claim 5, further comprising configuring the computer-readable button group programming instructions and data to sense and arbitrate among touches occurring on or within the second group and the second group is disposed along a first or second edge of the touchscreen.

9. The method of claim 5, further comprising locating the first group adjacent to the second group within the first portion of the touchscreen.

10. The method of claim 5, further comprising configuring the computer-readable button group programming instructions and data to sense and arbitrate among touches occurring on and within a third plurality of buttons, the third plurality of buttons being arranged in a third group located within the first portion of the touchscreen.

11. The method of claim 10, further comprising concatenating the third plurality of buttons to form a third slider located in the first portion of the touchscreen.

12. The method of claim 10, further comprising implementing the third slider by providing computer-readable button group programming instructions and data corresponding to a Flying V algorithm.

13. The method of claim 10, further comprising locating the third group adjacent to at least one of the first group and the second group within the first portion of the touchscreen.

14. The method of any one of claims 1, 5 and 10, further comprising configuring the computer-readable button group programming instructions and data to permit only a single button from among the first, second or third pluralities of buttons to generate a report that such single button has been touched or pressed by a user during a given time period or plurality of adjoining time periods.

15. The method of claim 14, further comprising generating the report notwithstanding the user having touched other buttons from among the first, second or third pluralities of buttons during the time period or plurality of adjoining time periods.

16. The method of claim 14, further comprising basing the report upon which button from among the first, second or third pluralities of buttons was touched first during the time period or plurality of adjoining time periods.

17. The method of claim 14, further comprising basing the report upon which button from among the first, second or third pluralities of buttons corresponds to the greatest touch strength sensed during the first period or plurality of adjoining time periods.

18. The method of claim 14, further comprising basing the report upon a grace period corresponding to the plurality of adjoining time periods, and such single button is selected from among the first, second or third pluralities of buttons on the basis of the greatest touch strength sensed during the plurality of adjoining time periods.

19. The method of claim 1, further comprising configuring the computer-readable button group programming instructions and data to permit static releases of a user's touch on or within a button in the first group.

20. The method of claim 1, further comprising configuring the computer-readable button or slider group programming instructions and data to permit dynamic releases of a user's touch on or within a button in the first group.

21. The method of claim 1, further comprising dedicating the second portions of the touchscreen to navigation.

22. A capacitive touchscreen system, comprising:
a first plurality of electrically conductive drive electrodes arranged in rows or columns;
a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto;
drive circuitry operably connected to the first plurality of drive electrodes; sense circuitry operably connected to the second plurality of sense electrodes and configured to sense input signals therefrom, and
a touchscreen controller operably connected to the first plurality of drive electrodes and the second plurality of sense electrodes, the touchscreen controller being operably connected to a host processor, the touchscreen controller having
computer-readable button group programming instructions and data loaded into a first memory portion thereof from the host processor, the computer-readable button group programming instructions and data comprising steps for sensing and arbitrating among touches occurring on and within a first plurality of buttons, firmware instructions and data being loaded into a second portion of the memory of the touchscreen controller;
wherein the first plurality of buttons is arranged in a first group on the touchscreen, the first group is located within a first portion of the touchscreen, and capacitive sensing of touches occurring on and within at least second portions of the touchscreen that are located outside the first portion of the touchscreen are controlled by the firmware instructions, wherein the first plurality of buttons are exclusive to one another, when one of the first plurality of buttons is pressed, the rest of the first plurality of buttons are disabled.

23. The capacitive touchscreen system of claim 22, wherein the first plurality of buttons is concatenated to form a first slider located in the first portion of the touchscreen.

24. The capacitive touchscreen system of claim 23, wherein the first slider is implemented by computer-readable button group programming instructions and data corresponding to a Flying V algorithm.

25. The capacitive touchscreen system of claim 22, wherein the computer-readable button group programming instructions and data are configured to sense and arbitrate among touches occurring on or within the first group and the first group is located along a first edge of the touchscreen.

26. The capacitive touchscreen system of claim 22, wherein the computer-readable button group programming instructions and data further include steps configured to sense and arbitrate among touches occurring on and within a second plurality of buttons, the second plurality of buttons being arranged in a second group located within the first portion of the touchscreen.

27. The capacitive touchscreen system of claim 26, wherein the second plurality of buttons is concatenated to form a second slider located in the first portion of the touchscreen.

28. The capacitive touchscreen system of claim 27, wherein the second slider is implemented by computer-readable button group programming instructions and data corresponding to a Flying V algorithm.

29. The capacitive touchscreen system of claim 26, wherein the computer-readable button group programming instructions and data are configured to sense and arbitrate among touches occurring on or within the second group and the second group is disposed along a first or second edge of the touchscreen.

30. The capacitive touchscreen system of claim 26, wherein the first group is located adjacent to the second group within the first portion of the touchscreen.

31. The capacitive touchscreen system of claim 26, wherein the computer-readable button group programming instructions and data further include steps configured to sense and arbitrate among touches occurring on and within a third plurality of buttons, the third plurality of buttons being arranged in a third group located within the first portion of the touchscreen.

32. The capacitive touchscreen system of claim 31, wherein the third plurality of buttons is concatenated to form a third slider located in the first portion of the touchscreen.

33. The capacitive touchscreen system of claim 32, wherein the third slider is implemented by computer-readable button group programming instructions and data corresponding to a Flying V algorithm.

34. The capacitive touchscreen system of claim 32, wherein the third group is located adjacent to at least one of the first group and the second group within the first portion of the touchscreen.

35. The capacitive touchscreen system of any one of claims 22, 26 and 31, wherein the computer-readable button group programming instructions and data further include steps configured to permit only a single button from among the first, second or third pluralities of buttons to generate a report that such single button has been touched or pressed by a user during a given time period or plurality of adjoining time periods.

36. The capacitive touchscreen system of claim 35, wherein the report is generated notwithstanding the user having touched other buttons from among the first, second or third pluralities of buttons during the time period or plurality of adjoining time periods.

37. The capacitive touchscreen system of claim 35, wherein the report is based upon which button from among the first, second or third pluralities of buttons was touched first during the time period or plurality of adjoining time periods.

38. The capacitive touchscreen system of claim 35, wherein the report is based upon which button from among the first, second or third pluralities of buttons corresponds to the greatest touch strength sensed during the first period or plurality of adjoining time periods.

39. The capacitive touchscreen system of claim 35, wherein the report is based upon a grace period corresponding to the plurality of adjoining time periods, and such single button is selected from among the first, second or third pluralities of buttons on the basis of the greatest touch strength sensed during the plurality of adjoining time periods.

40. The capacitive touchscreen system of claim 22, wherein the computer-readable button group programming instructions and data further include steps configured to permit static releases of a user's touch on or within a button in the first group.

41. The capacitive touchscreen system of claim 22, wherein the computer-readable button or slider group programming instructions and data further include steps configured to permit dynamic releases of a user's touch on or within a button in the first group.

42. The capacitive touchscreen system of claim 22, wherein the second portions of the touchscreen are dedicated to navigation.

\* \* \* \* \*